United States Patent
Hanai et al.

(10) Patent No.: US 7,409,515 B2
(45) Date of Patent: Aug. 5, 2008

(54) METHOD FOR EXCHANGING DATA BETWEEN VOLUMES OF STORAGE SYSTEM

(75) Inventors: Tomohiro Hanai, Yokohama (JP); Akihiko Sakaguchi, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 295 days.

(21) Appl. No.: 11/284,886

(22) Filed: Nov. 23, 2005

(65) Prior Publication Data
US 2007/0088929 A1 Apr. 19, 2007

(30) Foreign Application Priority Data
Oct. 13, 2005 (JP) .............................. 2005-298584

(51) Int. Cl.
*G06F 12/02* (2006.01)

(52) U.S. Cl. ................. 711/165; 711/113; 711/114; 711/147; 711/154; 711/111

(58) Field of Classification Search ................. 711/111, 711/113, 114, 147, 154, 165
See application file for complete search history.

(56) References Cited

U.S. PATENT DOCUMENTS

| | | | |
|---|---|---|---|
| 6,341,333 B1 * | 1/2002 | Schreiber et al. ............. | 711/114 |
| 6,675,274 B1 * | 1/2004 | Lam et al. ..................... | 711/170 |
| 6,851,019 B1 * | 2/2005 | Michel et al. ................ | 711/112 |

FOREIGN PATENT DOCUMENTS

JP          2002-32197          1/2002

* cited by examiner

*Primary Examiner*—Jack A Lane
(74) *Attorney, Agent, or Firm*—Mattingly, Stanger, Malur & Brundidge, P.C.

(57) ABSTRACT

A method of data exchange between volumes without using any unnecessary resource in a storage system includes allocating cache areas for data exchange on a memory, determining the location of data to be exchanged, reading out data from the determined location in source and destination volumes and storing data in their respective caches, and writing data stored in the cache to thus determined location of the volume different from the one that the data was read out.

13 Claims, 18 Drawing Sheets

METHOD FOR EXCHANGING DATA BETWEEN VOLUMES OF STORAGE SYSTEM

CLAIM OF PRIORITY

The present application claims priority from Japanese application P2005-298584 filed on Oct. 13, 2005, the content of which is hereby incorporated by reference into this application.

BACKGROUND

This invention relates to an improved method for managing volumes in a storage system.

The amount of data that is handled by a firm of the present day is increasing, together with the increase of storage capacity of the storage system. While the capacity of the storage system increases, rather than the volumes in a storage system won't have a homogenous performance but each of them will have a variety of performance levels, respectively. The optimum strategy of layout design of volumes to be used to store data based on the importance is required. In addition, since the importance of data is not always at a certain level, moving data between volumes having different performance is often needed.

Moving data between volumes is done in general by copying data from the source volume to the destination volume. In this case the data that exists in the destination volume is overwritten. The destination volume should be selected which must be an unused volume (the volume that stores only unnecessary data). Because of this, the storage management strategy with the assumption of moving data being anticipated requires for the system to have always an empty, blank volume to be served as a new destination of data. Always having a bunch of blank storage volumes to be served as the new destination volumes may be wasting the resource, and a high performance spare set of disk drives among other things not used for the routine work is not desirable in view of cost saving.

In contrast to this, JP 2002-32197 A suggests a method for exchanging data between the source volume and the destination volume for the purpose of moving data between volumes. According to this method the data can be moved without overwriting existing data on the destination volume. In this prior embodiment, two extra volumes are provided for temporary data backup in addition to two principal volumes from and to which the data is exchanging, to copy data from two principal volumes exchanging data to the temporary backup volumes, then to copy the data backed up in the temporary volumes to their respective destination volumes. According to this method, moving data is available even when the destination volume is not empty, if only two temporary backup volumes are provided.

SUMMARY

According to the related art as described above, however, the temporary backup volumes are required to be always available, which implicit the development of waste storage space that is not available for the normal operation. In particular there arises a problem that, if a number of volumes are to be moved at the same time, then the same number of empty volumes needs to be ready, or if there is only a few number of volumes available then overall data exchange takes times. There is also another problem that moving data takes twice the time than the conventional data movement because of data backup to the temporary backup volume.

When using the temporary backup volumes the storage space of the temporary volume must be larger than that of the volumes to be exchanged so that the size of backup volumes should be determined based on the size of the largest volume in the storage system, which imposes difficulty to the flexible operation. More specifically, when the data copy between volumes is executed in hardware, there may be cases where some requirements are present among volumes served for data copy such that a number of temporary backup volumes may be needed. For example, if the requirement present is such that the size of storage space between two volumes to be copied each other must be equal, the temporary volumes should be provided as much as the number of volumes of different capacity in the storage system.

This invention has been made in view of the above circumstances and has the object to provide a method of data exchange between volumes in a higher speed without requiring inefficient resources in the storage system.

According to this invention, a temporary storage area on a memory for the data exchange is provided, then the position of the data to be exchange is located, data is read out from the located position in first or second volume to store in the temporary storage area on the memory, and the data in the temporary memory area is written to the located position of the volume different from the volume from which the data is read out.

Next, at the time of migration (data exchange process or data moving process), if there is stored active data on the second (destination) volume, then the data is exchanged between volumes using the temporary storage area on the memory. If on the other hand there is not stored active data on the destination volume then the normal migration operation to copy from the first volume to the second volume is performed.

According to this invention, data will be exchanged between volumes using a temporary storage area such as disk cache and RAID cache to allow data to be moved without requiring any extra volume. This eliminates the need to prepare any extra volumes in the storage system, allowing much higher efficiency of the operation.

Furthermore, data exchange by reading data from the first (source) volume to the cache (temporary storage area) then by writing data to the destination volume enables the performance similar to that of volume-to-volume data copy, improving the processing speed of migration.

DETAILED DESCRIPTION OF THE EMBODIMENTS

First Embodiment

First embodiment of this invention will be described in greater details herein below with reference to the accompanying drawings.

Figure 1:
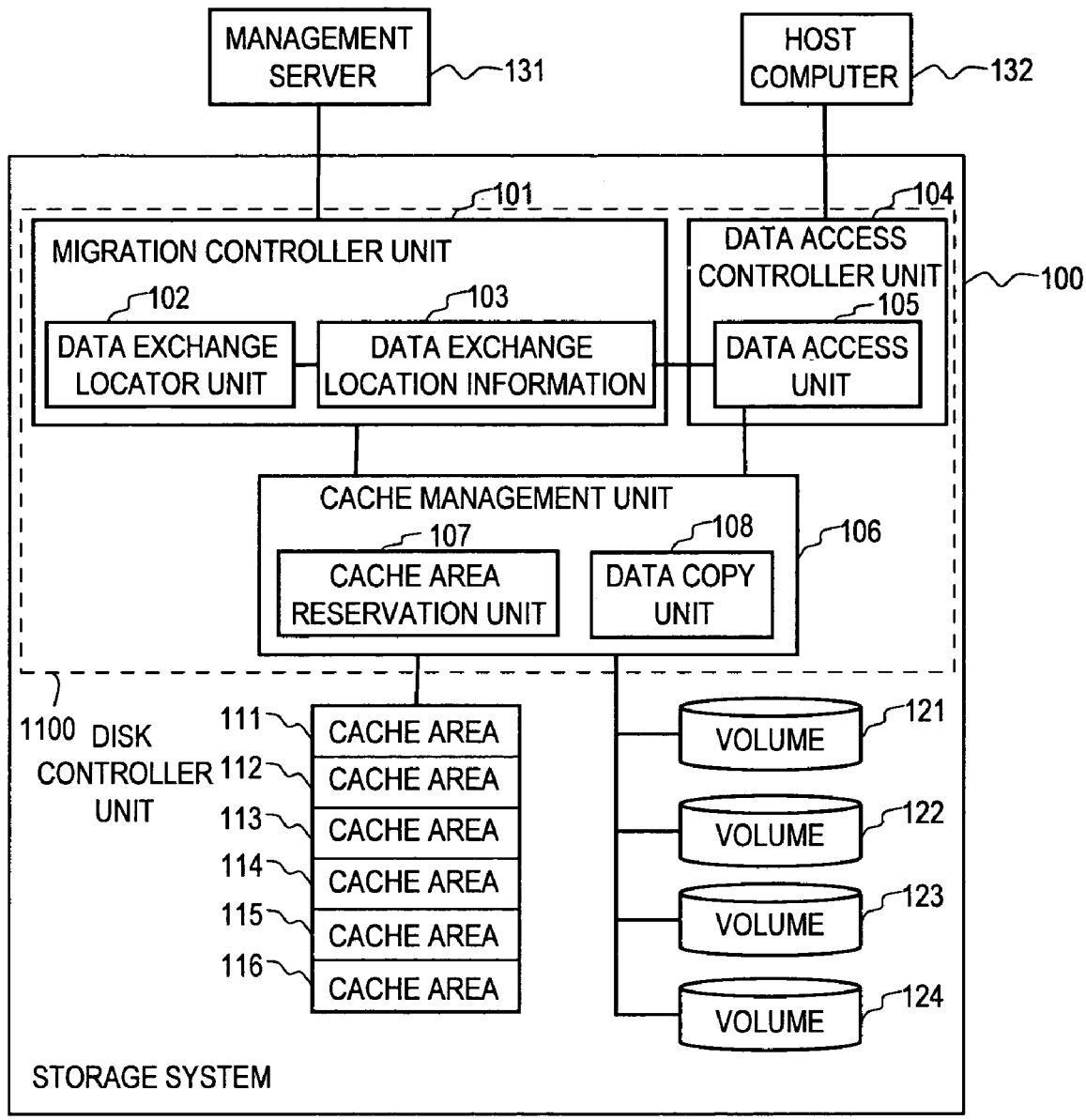
FIG. 1 is a system overview of first embodiment according to this invention.

FIG. 1 is a schematic block diagram of a storage system according to this invention. A storage system 100 includes, as described in connection with FIG. 2, a CPU 11, a memory (cache) 12, I/O interface 14 to 16 and plural disk drives 3 to 5. The storage system 100 incorporates therewithin a migration controller unit 101, a data access controller unit 104, a cache management unit 106, plural cache areas 111 to 116, and plural volumes 121 to 124. The cache areas 111 to 116 are allocated on a predetermined area on the memory 12; the volumes 121 to 124 are each allocated to a predetermined disk drive 3 to 5 by the data access controller unit 104.

The migration controller unit 101, data access controller unit 104, and cache management unit 106 are shown achieved by the software loaded on the memory in this embodiment. The entirety of these controller and management units is termed herein as a disk controller unit 1100.

Figure 2:
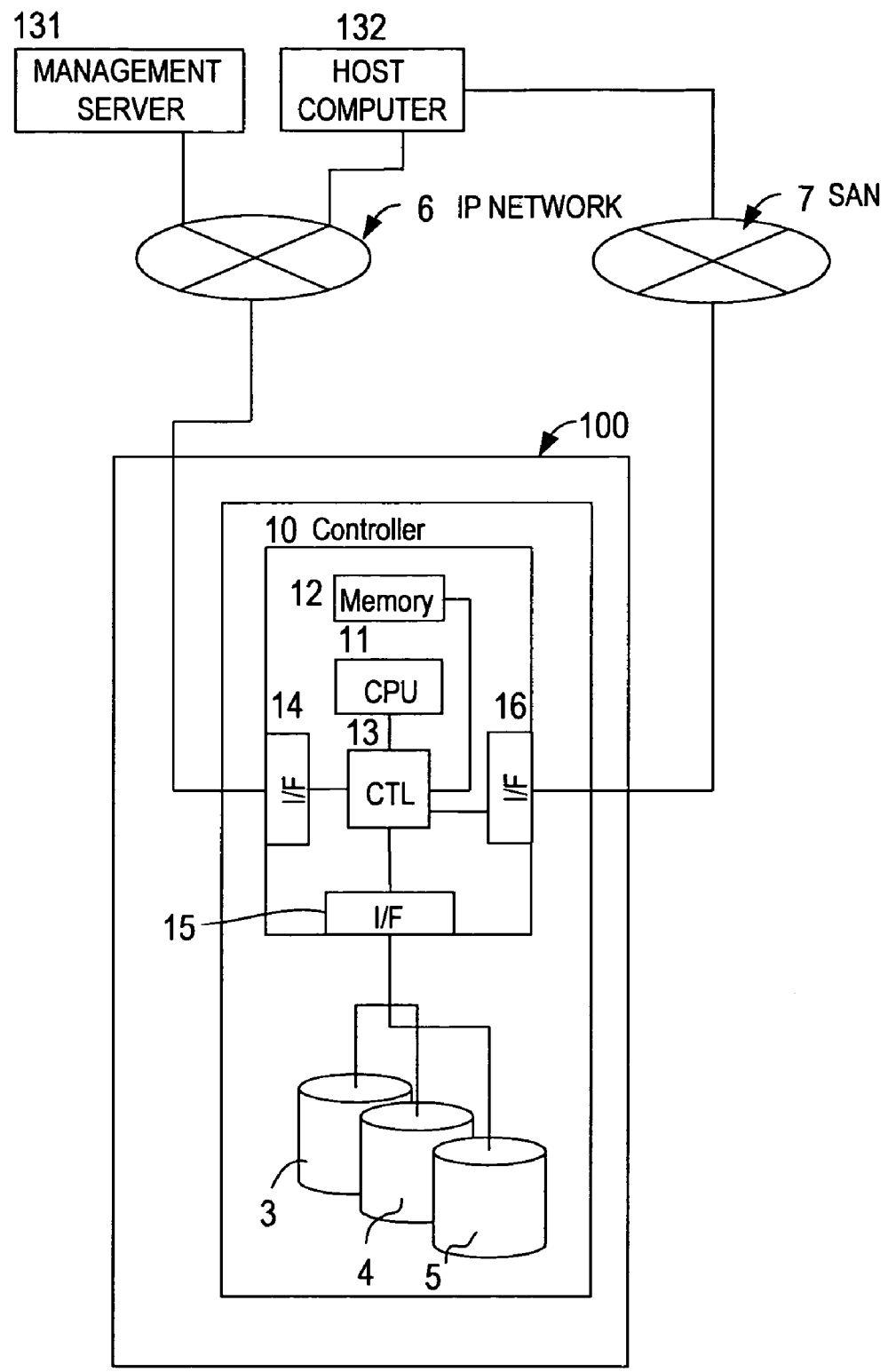
FIG. 2 is a schematic diagram of hardware configuration of a storage system.

FIG. 2 is a schematic block diagram of hardware of the storage system 100.

On the IP network 6 are interconnected a management server 131, which manages the storage system 100, and a host computer 132. The host computer 132 is also connected to the storage system 100 via a SAN (Storage Area Network) 7, and the host computer 132 may have I/O access to the storage system 100 through SAN 7.

The storage system 100 has a CPU 11, a memory 12 including the cache storage area, a data transfer controller unit 13, an IP network interface 14, an interface 15 to the storage, and an interface 16 to the SAN 7. To the interface 16 are connected plural disk drives 3 to 5, and a volume is created on each of drives, as described above.

The storage system 100 is connected to the IP network 6 through the IP network interface 14 to receive from the management server 131 the data exchange request and data movement request.

The storage system 100 also has access to the disk drives 3 to 5 to which the CPU 11 stores data, through the interface 15. A cache (disk cache) area (as shown by 111 to 116 in FIG. 1) for temporary storage of data by the volume access is allocated on the memory 12.

The data transfer controller unit 13 transfers data between the CPU 11, the IP network interface 14, the storage interface 15, the SAN interface 16 and the memory 12.

A controlling program for executing the disk controller unit 1100 is loaded on the memory 12, and the CPU 11 calls the controlling program to the memory 12 to execute it to achieve the functionality of the above-mentioned various controller and management units. The cache area may be allocated only on a memory not shown, which is physically separated memory, different from the main memory that the CPU 11 accesses, other than on the memory 12 on which the CPU 11 stores the controller programs and the like.

Next, in FIG. 1, the migration controller unit 101 has therein a data exchange locator unit 102 and data exchange location information 103, and is connected to the management server 131 through the IP network 6. The management server 131 issues a migration request (i.e., data exchange request and data movement request) between volumes to the migration controller unit 101 to commence such data exchange or data movement operation. The management server 131 incorporates a CPU, a memory and an I/O interface not shown in the figure, and is operated by an operator. In the present embodiment, if there is active data stored in the destination volume, then the data exchange operation as will be described later will be selected, while on the other hand if the destination volume is writable or in other words there is no active data then the data movement operation as will be described later will be selected instead.

The migration controller unit 101 uses the data exchange locator unit 102 to determine the data exchange position (or data movement position) on the target volume and store thus located data exchange position in the data exchange location information 103. The data exchange position can be for example indicated by the logical block address (LBA) number.

The migration controller unit 101 is also connected to the cache management unit 106 to perform reservation of the cache area 111 to 116 used in the data exchange operation and data movement operation as well as to control data copy between the caches 111 to 116 and the volumes 121 to 124.

The data access controller unit 104 is connected to the host computer 132 through the SAN 7 to receive the data read request and the data write request from the host computer 132. The host computer 132 is a computer used by any user, which also incorporates a CPU, a memory and an I/O interface not shown in the figure.

The data access controller unit 104 has a data access unit 105 therein, which is connected to the data exchange location information 103. A data access controller unit 104 directs the data access unit 105 to process the request at the time of performing operation of data read request and data write request from the host computer 132.

The data access unit 105 is connected to the data exchange location information 103 and the cache management unit 106 to refer the data exchange location information 103 based on the data position of data read request and data write request from the host computer 132 to issue data read and write requests to the cache controller.

The cache management unit 106 is connected to the cache areas 111 to 116 and the volumes 121 to 124 to use a cache area reservation unit 107 according to the request from the migration controller unit 101 to perform the reservation process of the cache areas 111 to 116. The reservation is the process of reserving an area to be used as data buffer for the exchanging data in the data exchange process on the cache area that operates as disk cache or RAID cache. It also uses the data copy unit 108 according to the request from the migration controller unit 101 and the data access controller unit 104 to copy data between the cache areas 111 to 116 and the volumes 121 to 124. The data copy within the cache areas 111 to 116 is also possible.

As will be described later, the storage system 100, in response to the data exchange request and the data movement request from the management server 131, uses the migration controller unit 101 and the data access unit 105 to perform the data exchange or movement between volumes. The data exchange request involves the administrator of the storage system 100 designating the source and destination volumes to direct the storage system 100. The data exchange request may be consisted of for example movement of frequently updated data or important data to a higher performance volume and movement of less frequently updated data or less important data to a lower performance volume. The performance of a volume is termed as the transfer rate and the response time of each volume, seen from the host computer 132, which is dependent on the disk drive having the volume set thereon. In general, a high performance disk drive may have less storage capacity but faster transfer rate and response time, and costs more. A low performance disk drive, on the other hand, may tend to have more storage capacity and lower transfer rate and response time, and cost less. Therefore the administrator should execute the data exchange (or data movement) for reallocation of data in order to match the operation cost of the computer system.

Now the operation will be described in greater details herein below when performing data exchange between two volumes with reference to FIGS. 3 to 5.

Figure 3:
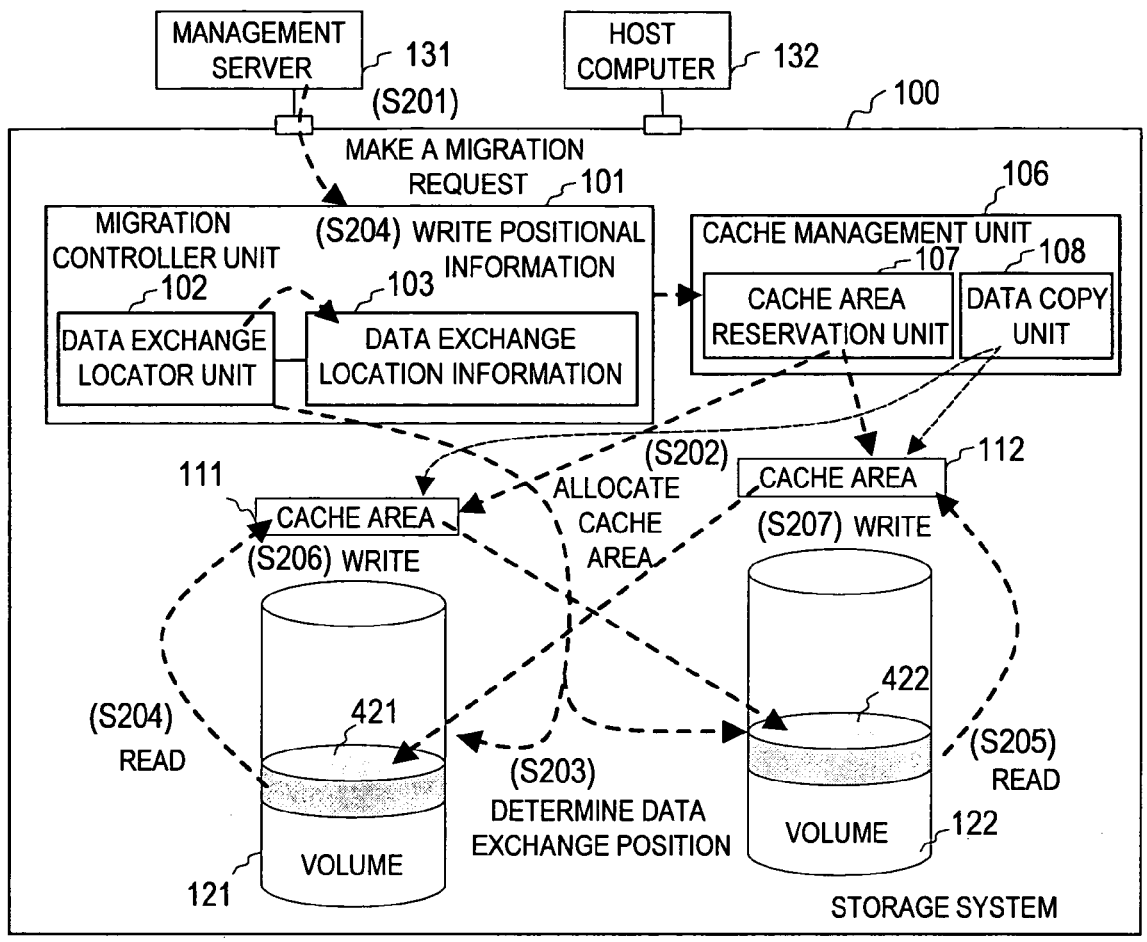
FIG. 3 is a schematic diagram of data exchange between volumes by means of cache areas.

FIG. 3 is a schematic block diagram showing data exchange between volumes in response to the request issued from the management server 131.

The management server 131 specifies the volume 121 and the volume 122 to request a data exchange request to the migration controller unit 101 (S201). The capacity of volumes 121 and 122 to which data will be exchanged is the same.

The migration controller unit 101, upon reception of a data exchange request, instructs the cache area reservation unit 107 to reserve the cache area 111 and the cache area 112 as the working space for data exchange (S202). The cache area reservation unit 107 prepares the cache areas of a predetermined capacity for the cache area 111 and the cache area 112. The capacity of the cache area 111 and that of the cache area 112 that the cache area reservation unit 107 provides are set to the same amount.

The migration controller unit 101 instructs the data exchange locator unit 102 to start data exchange, the data exchange locator unit 102 in turn determines the data exchange position (S203), and stores the data exchange position into the data exchange location information 103 (S204). The data exchange locator unit 102 sets an initial value predetermined as default value of the data exchange position. The initial value may be such that LB=0, for example. In the present embodiment, only one single data exchange location information 103 indicates the same position in two volumes 121 and 122 because the data exchange on two volumes 121 and 122 will be performed at the same time.

Next, the migration controller unit 101 instructs the data copy unit 108 to copy to the cache area 111 the data 421 of the predetermined data length, present at the data exchange position of the volume 121 (S205). In a similar manner, the data copy unit 108 will copy the data 422 located at the data exchange position of the volume 122 to the cache area 112 (S206). The data length (capacity) of the data 421 and the data 422 to be copied by the data copy unit 108 from the volumes 121 and 122 to the cache areas 111 and 112 respectively will be set to the same amount.

Next, the migration controller unit 101 instructs the data copy unit 108 to copy the data residing in the cache area 111 to the data exchange position 422 of the volume 122 (S207). In the same manner, the data copy unit 108 will copy the data residing in the cache area 112 to the data exchange position 421 of the volume 121 (S208). Once the copy operation is complete, the migration controller unit 101 updates the data exchange location information 103 by adding a predefined value (the length of copied data 421 and 422).

By iteratively repeating the above-mentioned steps S203 to S208 the data stored in the volume 121 and the data stored in the volume 122 are sequentially exchanged, with the data exchange location information 103 indicating the current data exchange position.

In the course of migration with the destination volume containing active data stored thereon, according to the above operation, the data on the source can be migrated to its new destination while the data on the destination volume is backed up to the source volume, without providing a temporary storage volume.

Figure 4:
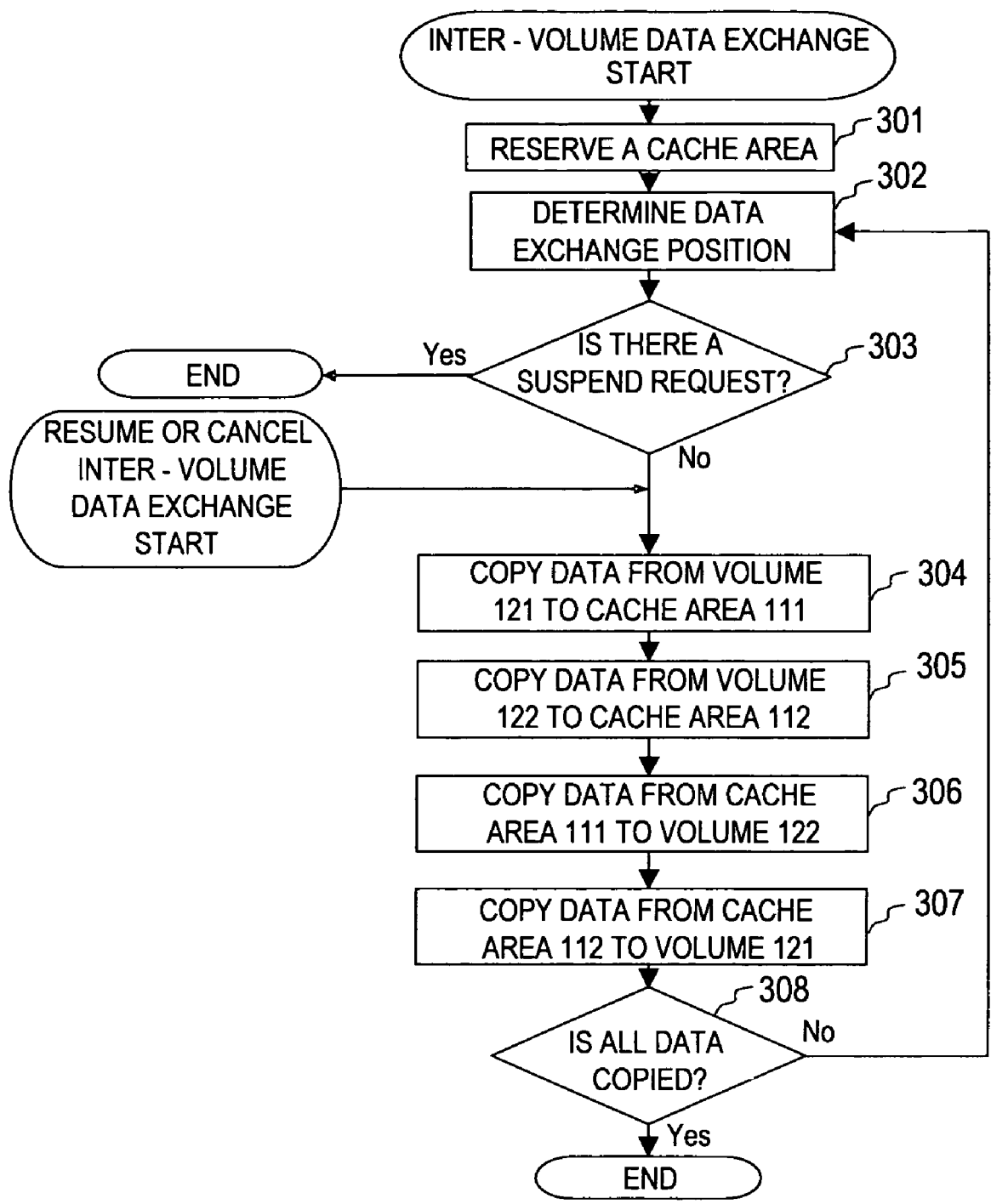
FIG. 4 is a flow chart of data exchange between volumes by means of cache areas.

FIG. 4 is a flow chart of the data exchange operation performed by the controller units in the storage system 100.

The migration controller unit 101 receives a data exchange request from the management server 131 to start the data exchange process as described as follows.

In step 301, a cache area is reserved as the working space for the data exchange. The cache area reservation unit 107 selects two available among cache areas 111 to 116, for example such as the cache 111 and the cache 112, to reserve them for the data exchange. The remaining caches 113 to 116 will be used for I/O access.

In step 302, a data exchange position will be located. The data exchange locator unit 102 will preset an initial value predetermined on the data exchange location information 103 on the memory as the initial value for the data exchange position.

In step 303, the migration controller unit 101 decides whether or not the management server 131 requests a suspend of data exchange, if a suspending request is issued then it will suspend the data exchange to terminate the process, otherwise if not then the process proceeds to step 304.

In step 304, the data copy unit 108 copies the data of a predetermined length at the data exchange position from the volume 121 to the cache area 111.

In step 305, the data copy unit 108 copies the data of a predetermined length at the data exchange position from the volume 122 to the cache area 112. At this point, data 421 and 422 of the same length (capacity) are stored in the cache area 111 and the cache area 112, respectively.

In step 306, the data in the cache area 111 is copied to the data exchange position on the volume 122.

In step 307, the data in the cache area 112 is copied to the data exchange position on the volume 121. This means that the data 421 of the volume 121 will be stored at the data exchange position on the volume 122 while the data 422 of the volume 122 will be stored at the data exchange position on the volume 121 to complete one data exchange chunk of the data exchange process.

In step 308, the migration controller unit 101 decides whether or not the swap copy of all data on the volume 121 and on the volume 122 is complete, and if any data not yet copied is still present then the process proceeds to step 302. If otherwise any data not yet copied is NOT present then the process terminates. In other words, the migration controller unit 101 decides whether or not the data exchange location information 103 has reached to the designated end of the volume 121 (122). The designated end is set to the maximum value of LBA in the volume 121 (122) (the dead end).

During the data exchange as described above, when data exchange is suspended due to the suspending request issued in step 303 and a resume request of the suspended data exchange is issued then the process resumes from the step 304.

The suspending request is a request directed by the administrator to the storage system 100 through the management server 131. More specifically the administrator monitors the operation status of the storage system 100 from the management server 131, and may direct the storage system 100 to suspend data exchange if the load of the storage system 100 during the data exchange increases considerably.

According to the above-mentioned process, the contents of two volumes 121 and 122 can be exchanged without providing a volume for data exchange as is required in the prior art.

More specifically, to exchange the contents of the volume 121, the data exchange source and the contents of the volume 122, the data exchange destination, by copying the same amount of data at the position pointed by the data exchange location information 103 to two cache areas 111 and 112, then by writing data from the cache areas 111 and 112 to the volumes 121 and 122, the need to use another volume is eliminated when the destination volume contains data in use, allowing data to be exchanged faster.

Figure 5:
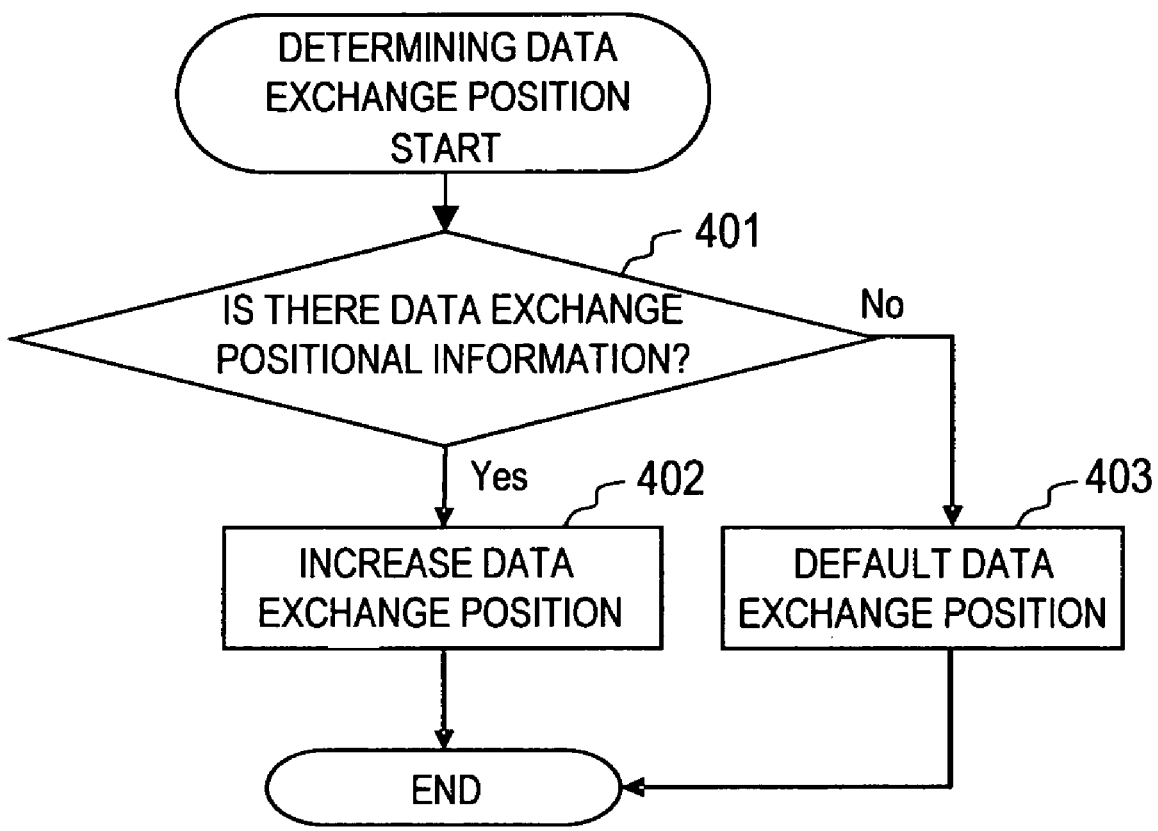
FIG. 5 is a flow chart of locating the data exchange position.

FIG. 5 is a flow chart of the subroutine of locating the data exchange position as shown in S302 of FIG. 4 above.

The data exchange locator unit 102 of FIG. 1 calculates data position in the volume subject to data exchange in response to the request from the migration controller unit 101.

In step 401, the data exchange position is checked whether to be already present in the data exchange location information 103. If present, then the process proceeds to step 402, otherwise if not then the process proceeds to step 403. The data exchange location information 103 may be embodied as a resister or a pointer configured on the memory 12.

In step 402, the position is incremented by the size of the cache area 111 with respect to the current data exchange location information 103. In other words, the immediately previous data exchange position is added with a value equal to the amount of data copied in the immediately previous copy (the capacity of a cache area), then the sum is determined as the next data exchange position to be used. This operation moves the data exchange position by a step of the cache area capacity from the head of a volume when the data exchange is started, and data exchange can be continued to the end of that volume.

In step 403 the head position of the volume 121 (or 122) is set for the initial value of the data exchange position. Since the volume 121 and the volume 122 are configured to have the same storage capacity, once either of these two data exchange positions has been determined, two volumes 121 and 122 can be copied and written at the exact same location. Then the data exchange locator unit 102 allows sequential exchange of data between volumes by the incremental unit of the size of the cache area 111 and cache area 112.

Once the data exchange is complete between volume 121 and the volume 122, the data access controller unit 104 switches the path configuration of the volume 121 and the volume 122 in the host computer 132. The host computer 132 thereby will be able to access the target data without any concern on the volume swap by the data exchange operation and data movement operation.

In addition, the migration controller unit 101 maintains the data exchange location information 103 when receiving a suspending request of the data exchange. Then migration controller unit 101 then uses the data exchange position retained in the data exchange location information 103 to resume the data exchange when receiving a resume request of data exchange.

Figure 6:
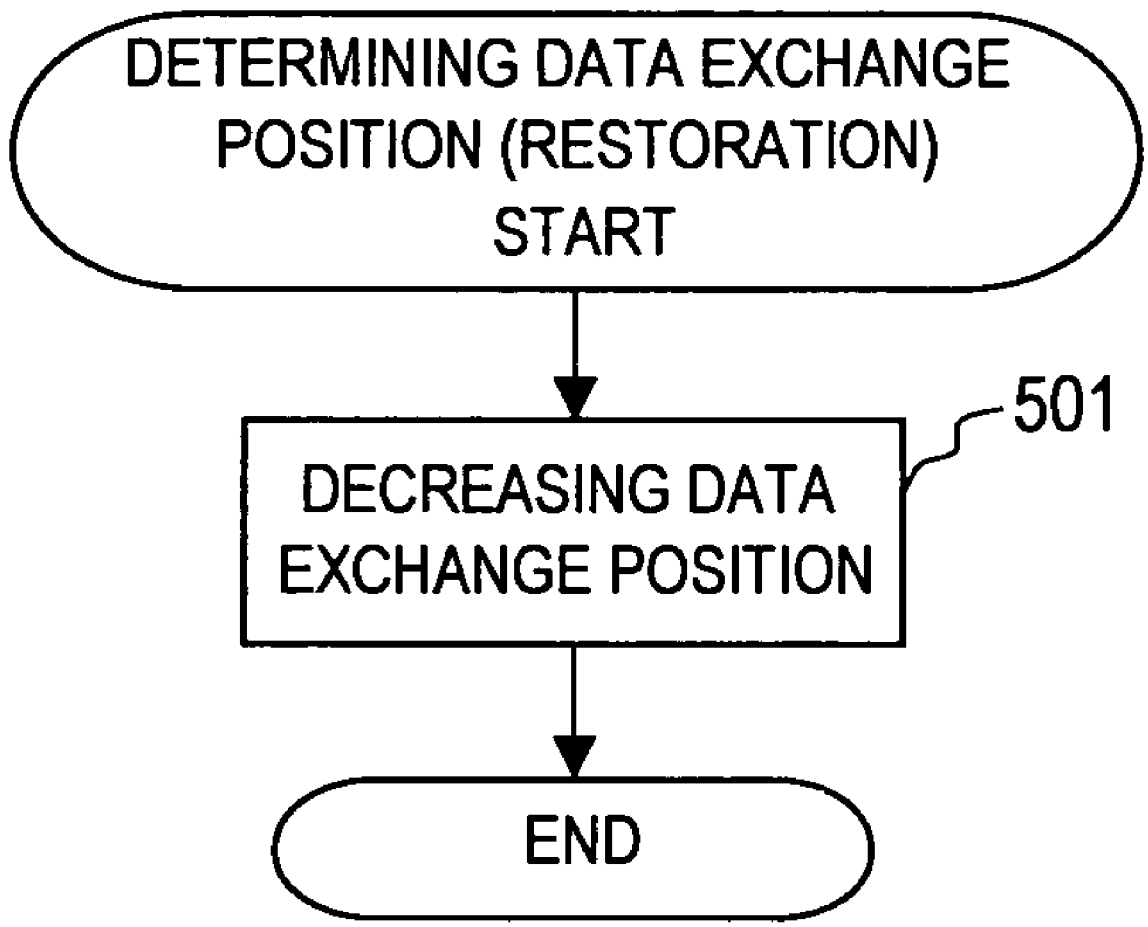
FIG. 6 is a flow chart of data exchange position determination for the cancel operation to restore the volume status to the status prior to the beginning of the volume exchange.

FIG. 6 is a flow chart of data exchange position determination for the cancel operation in order to recover the volume status to the status immediately prior to the beginning of the volume exchange, when a suspending request has terminated the data exchange to the suspend status due to the suspending request issued in step 303 of FIG. 4. This process is executed according to a data exchange cancel request from the management server 131.

In step 501 the data exchange locator unit 102 decreases the data exchange position by the storage size of the cache area 111 with respect to the current data exchange location information 103.

The operation to restore the volume to the status prior to starting the data exchange operation can be achieved by executing the data exchange position determination of FIG. 6 instead of FIG. 5, in the data exchange position determination (step 302) in the flow chart of data exchange shown in FIG. 4.

More specifically, the migration controller unit 101, upon receiving a suspending request of data exchange, maintains the data exchange location information 103. The migration controller unit 101 may perform data exchange in the reversal direction by decreasing the data exchange position retained in the data exchange location information 103 by the storage size of the cache area 111 upon cancel request of the data exchange. The contents of the volume 121 and the volume 122 thereby can be restored to the status prior to the start of data exchange operation.

When suspending data exchange, the data exchange position (suspended position) may also be stored in a predetermined address in the memory 12.

Thereafter, upon reception of the cancel request of the data exchange, and if data exchange position is present in the data exchange location information 103, the positional information with the size of the above-mentioned cache area being decremented from the data exchange position will be determined for the position of the data to be exchanged in the reverse direction. Otherwise, if the data exchange position is not present in the data exchange location information 103, the current position as the position of data to exchange in the reverse direction can be determined by decrementing the size of cache area from the suspending position stored in the memory 12.

In the data exchange in the reverse direction based on a cancel request, the operation will be executed in the reverse direction to the arrows of the data 421 and data 422 to be exchanged in FIG. 3. The data moved to the volume 122 will be restored to the volume 121, while the data moved to the volume 121 will be restored to the volume 122.

Now the operation when the host computer 132 executes an I/O access (read request or write request) during the data exchange between volumes will be described in greater details, with reference to FIGS. 7 and 8.

Figure 7:
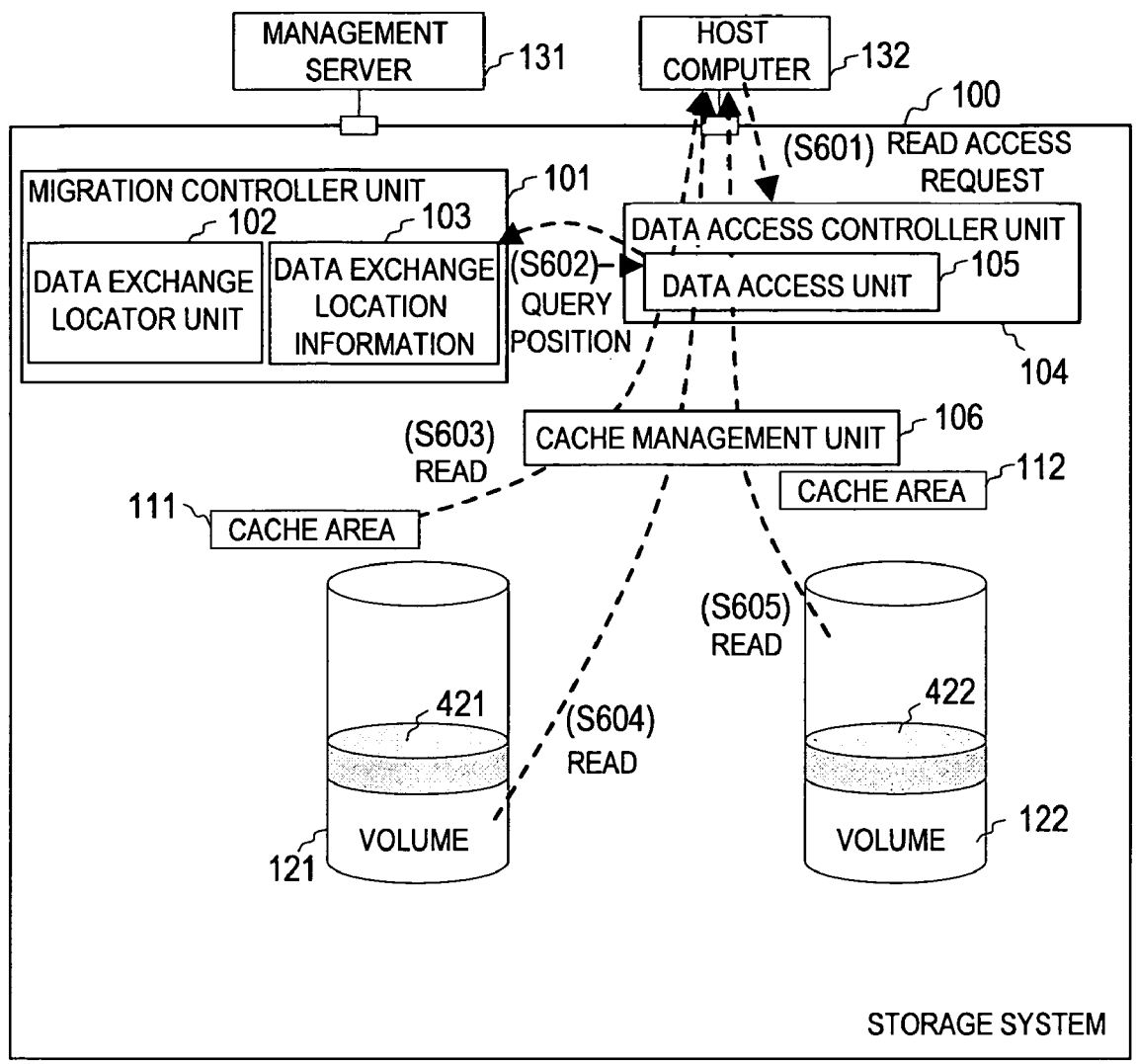
FIG. 7 is a schematic diagram of the operation when data access is requested during data exchange.

FIG. 7 is a schematic diagram of the operation performed by the data access controller unit 104 when the host computer 132 issues a read access request to the volume 121.

The host computer 132 specifies the target volume 121 and the read access request location to request a read access to the data access controller unit 104 (S701). The data access controller unit 104 instructs the data access unit 105 to request a read access from the host computer 132.

The data access unit 105 queries the data exchange position of currently performed data exchange to the data exchange location information 103 (S702), if the read access request position is equal to data exchange position then it reads data out from the cache area 111 through the cache management unit 106 to transfer the data to the host computer 132 (S703). The data of the read access request position is already in the cache area 111 so that the volume 121 will not be needed to be accessed and the response time can be shortened.

When the read access request position is larger than the data exchange position (i.e., in a posterior position), the requested data is not yet exchanged, thus the data access unit 105 instructs the cache management unit 106 to read data out from the read access request position of the volume 121 to transfer the data to the host computer 132 (S704).

When read access request position is less than (i.e., in an anterior to) the data exchange position, the requested data is already exchanged, so that the data access unit 105 instructs the cache management unit 106 to read data from the read access request position on the volume 122 to transfer to the host computer 132 (S705).

As the access from the host computer 132 is to the data, if it accesses data on the previous volume after data exchange it will see wrong data. Because of this, the identification numbers of volumes seen from the host computer once the data exchange is complete between volumes is to be swapped between them to enable data access using the same identification number from the host, such that the host computer does not need to take care of data exchange between volumes.

In the operation shown in FIG. 7, the location of appropriate data is determined to be either of volumes, even when data exchange is being performing, so as to return the correct data that corresponds to the access request to the host computer 132. The data exchange between volumes can be implemented without preventing access from the host computer 132.

Figure 8:
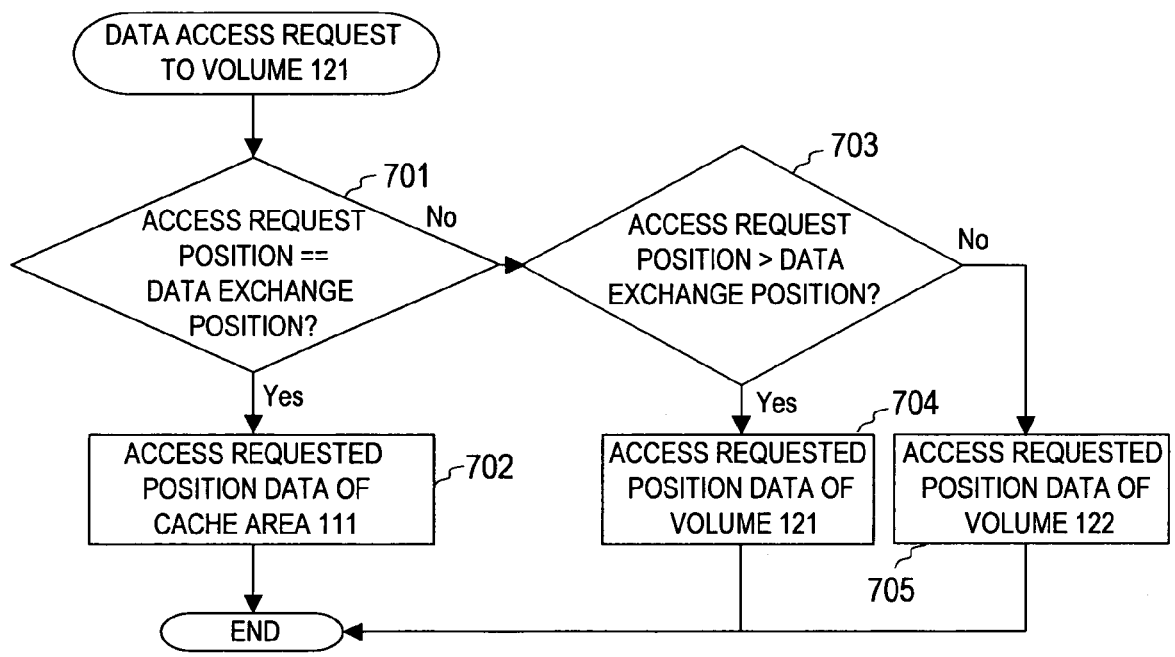
FIG. 8 is a flow chart of the data access during data exchange.

FIG. 8 is a flow chart when the host computer 132 issues a read or write access request to the volume 121 during the data exchange in progress.

In step 701, the data access controller unit 104 decides whether the data position requested by the access from the host computer 132 is equal to the data exchange position. If it is equal then the process proceeds to step 702, otherwise it proceeds to step 703.

In step 702 the data access controller unit 104 performs the access requested by the host computer 132 to the data in the cache area 111 to return the result to the host computer 132.

In step 703 the data position of the access requested by the host computer 132 is determined whether to be larger than (or in the posterior of) the data exchange position. If the position is larger then the process proceeds to step 704, otherwise if not (in the anterior position) then the process proceeds to step 705.

In step 704, since the requested data is still not exchanged, the data access controller unit 104 proxies the access requested by the host computer 132 to the data in the access request position in the volume 121 and transfers the result thereof to the host computer 132.

In step 705, since the requested data is already exchanged, the data at the access request position in the volume 122 is accessed as was requested by the host computer 132 to transfer the result thereof to the host computer 132.

When an access request is issued while the data exchange is suspended, the operation is the same as described above. During suspending the data exchange, the data exchange location information 103 maintains the data exchange position in the suspended status, the access to the volume 121 or to the volume 122 may be granted in response to the determination in steps 701 and 703 above, based on the comparison of data exchange position in the data exchange location information 103 with the data position of requested access.

Second Embodiment

Figure 9:
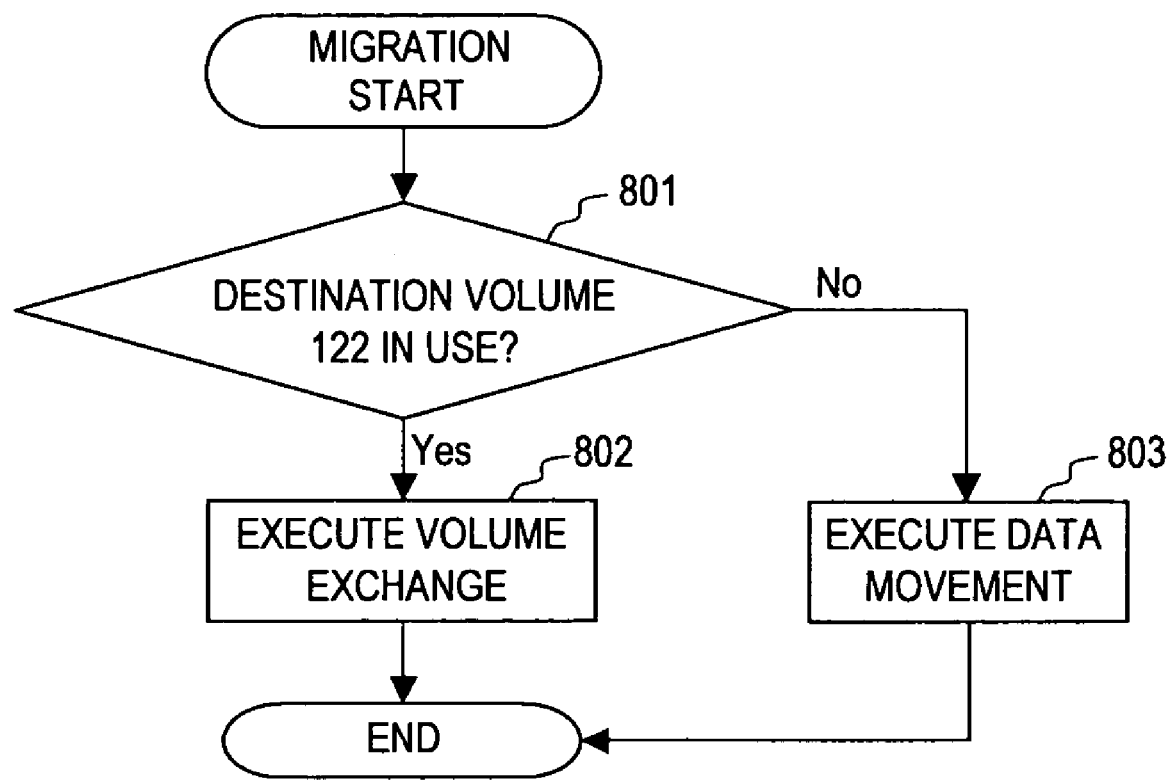
FIG. 9 is a flow chart illustrating how to switch data movement scheme in correspondence with the destination volume, according to second embodiment of this invention.

FIG. 9 is a second embodiment of this invention, in the form of a flow chart illustrating the switching from the data exchange between volumes to the data movement between volumes and vice versa, upon data exchange request (migration request) between volumes, depending on the volume status of the data copy destination. This operation is executed in the migration controller unit 101 at the time when the management server 131 issues a data exchange request.

The management server 131 issues a migration request to the migration controller unit 101, with the volume 121 specified as the source of migration of volume and the volume 122 as the destination of migration of volume.

In step 801 the volume 122 is determined whether to be in operation or not by seeing the status of the volume 122 specified as the destination of migration. If the volume 122 is in use, then the process proceeds to step 802. Otherwise if it is not in use, then the process proceeds to step 803.

The determination of whether the volume 122 is in use may be by determining whether or not the volume 122 is in an accessible status from the host computer 132 (for example, the presence or absence of the configured access path and the like).

In step 802, data exchange between volumes will be performed between the volume 121 and the volume 122 according to the method stated above.

In step 803, data movement will be performed by simple data copy from the volume 121 to the volume 122.

In the steps 801 to 803 above, data on the destination volume is not read out and write down to the source volume, assuming that the contents of the destination volume can be discarded if the destination is not in use, in order to decrease the number of volume accesses so as to save the time consumed by the migration operation.

According to the method stated above, if the data exchange is not necessary when the management server 131 issues a data exchange request, the system performs data movement. More specifically, the data on the destination volume of the data exchange is not available from the host computer 132, then the data on the destination volume of data exchange is determined not to be needed, and the data on the source is simply written to the destination volume of data exchange in order to enable a high-speed operation.

Third Embodiment

Figure 10:
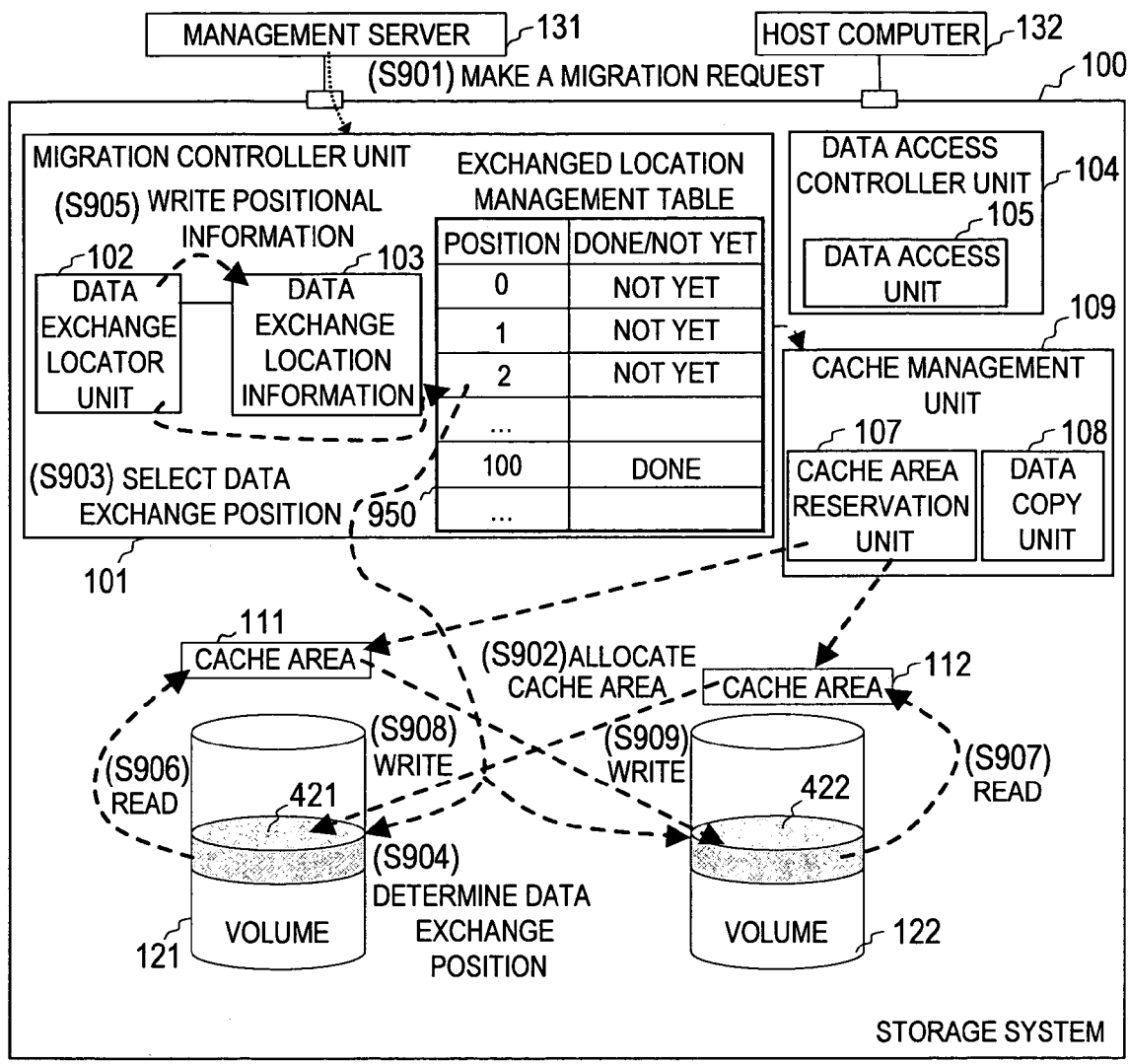
FIG. 10 is a schematic diagram illustrating data exchange in an arbitrary order by means of an exchanged location management table.

FIG. 10 shows a third embodiment of this invention, in which the migration controller unit 101 according to the first embodiment is added with the exchanged location management table 950, which indicates the status (progress) of the data exchange. Other components are identical to those in the first embodiment.

The exchanged location management table 950 is a table configured on the memory 12 of the storage system 100, in which a row contains a location number from 0 to n for each of volumes to be data exchanged, a location number has a variable data column ("done or not yet" in the figure), indicative of whether data exchange is complete ("done" in the figure) or not complete ("not yet" in the figure).

The exchanged location management table 950 manages the data exchange status (progress) by first segmenting the data area of the target volume subject to data exchange into a number of fragments, and adding a location number to each of fragments. The size of a fragment to which a volume is segmented is preferably the data exchange unit for example, and in the present embodiment the fragment size is set to the size of cache area to be used in the data exchange. More specifically, the volume subject to data exchange is segmented to plural fragments at the size of cache area used, from the head of the volume subject to data exchange, and then the number of segments may be served as the location number.

The data exchange locator unit 102 segments the data area of the volume subject to data exchange into a number of data exchange units (for example equal to the size of cache area), then numbers each of segmented fragments with a continuous location number, and writes as the location number of the exchanged location management table 950 in response to the status of data exchange. The data exchange locator unit 102 upon completion of data exchange in one data exchange location, writes "done" in the status column of the location number corresponding to the current data exchange position. The data exchange locator unit 102 seeks the next location number with the status of "not yet" in the exchanged location management table 950 to determine the next data exchange location.

FIG. 10 shows an example of data exchange between volumes in which data of locations in a volume is exchanged in an arbitrary order by managing with the exchanged location management table 950 the area that data exchange has completed and the area that data exchange is not yet completed.

When the management server 131 issues a data exchange request (migration request) (S901), the migration controller unit 101 instructs the cache management unit 109 to allocate a cache area to be served in the data exchange (S902).

The migration controller unit 101 uses the exchanged location management table 950 to manage the volumes whether data exchange of the data in a location in a volume has completed or not. The migration controller unit 101 selects one of not yet data exchanged locations (S903) to determine thus selected location to be the position of data exchange (S904), and stores the location information into the data exchange location information 103 (S905).

Thereafter, the cache areas 111 and 112, which are allocated for the data exchange, are used to exchange data at the data exchange position (S906 to S909).

Finally, for the location having data exchange executed, the corresponding row of the exchanged location management table 950 is updated to "data exchange done" status.

As can be seen from the foregoing description, data example can be performed from an arbitrary location in a volume by using the exchanged location management table 950, allowing flexible data exchange to be achieved such as data exchange with the priority to the area most frequently accessed by the host computer 132. When data exchange is performed between volumes of different performance, it can be conceivable that the area of higher access frequency in the lower performance volume may have a higher priority to the data exchange. In such a case the data the most frequently accessed will be moved first to a volume of higher performance, resulting in a higher rate of I/O access from the host computer 132 to the higher performance volume, allowing earlier improvement of I/O access performance.

When data exchange starts from an arbitrary location on a volume, one possible approach to determine the data exchange position is to give priority to the area to which the host computer 132 has accessed, as will be described below. This approach uses the data read out to the cache due to the access from the host computer 132 as is for data exchange, so that the improvement of data exchange processing speed will be expected.

Next, how to give priority to the area to which the host computer 132 has accessed, will be described in greater details with reference to FIG. 11.

Figure 11:
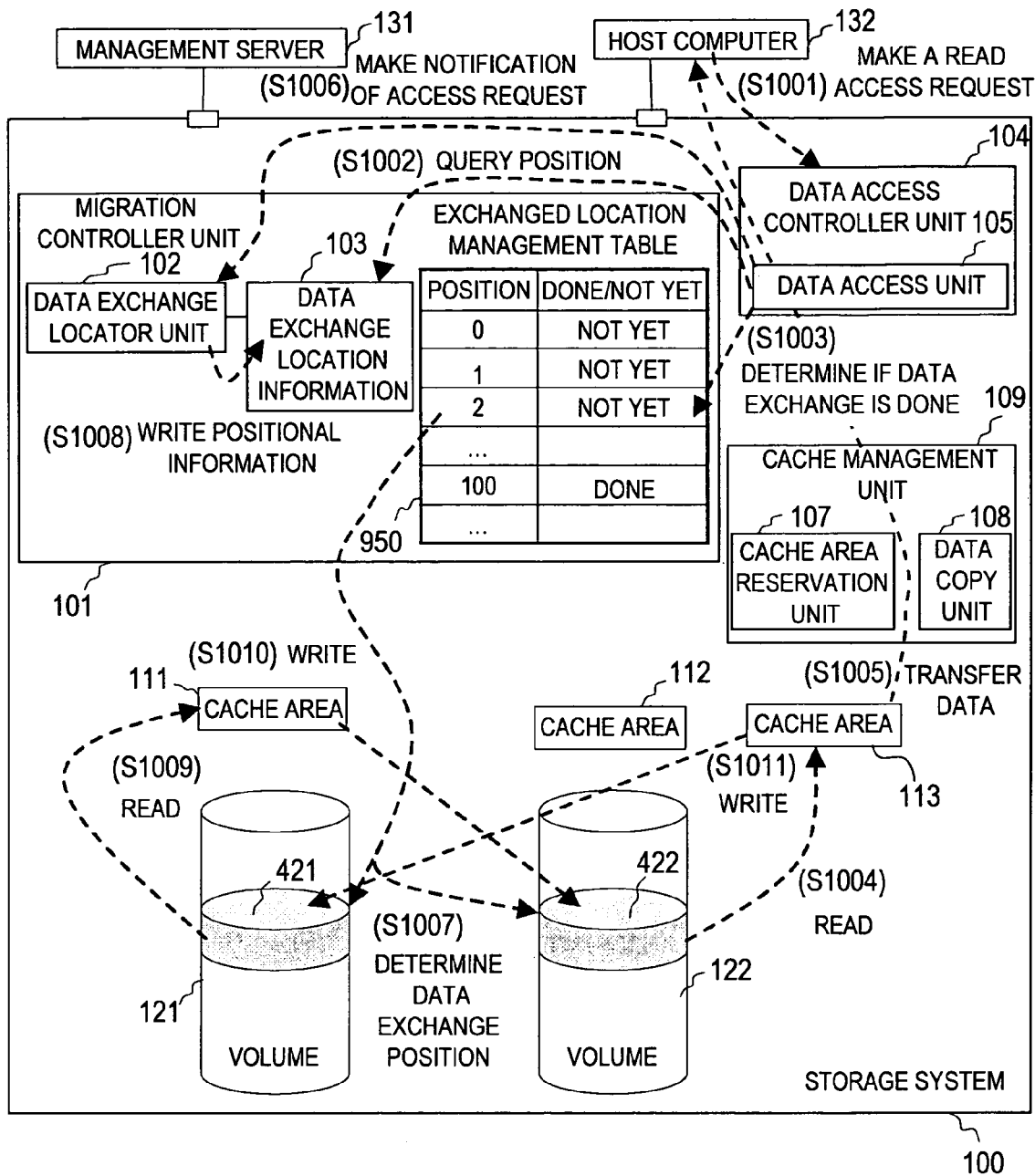
FIG. 11 is a schematic diagram illustrating data exchange initiated by a data access.

FIG. 11 is a schematic diagram describing how to perform data exchange when the host computer 132 initiates a read access to the volume 122 during the data exchange between the volume 121 and the volume 122.

When the host computer 132 requests a read access to the data access controller unit 104 (S1001), the data access controller unit 104 in turn instructs the data access unit 105 to process the read access request.

The data access unit 105 queries the data exchange location information 103 on the data exchange position of the data exchange currently in progress (S1002).

If the read access request location is different from the data exchange position, then the exchanged location management table 950 is used to determine the data exchange at the read access request location has been complete or not (S1003).

The data exchange at the read access request location is not yet executed, then the data access unit 105 instructs the data copy unit 108 to transfer the data 422 at the read access request location on the volume 122 to the cache area 113 (S1004), then successively to transfer the data in the cache area 113 to the host computer 132 as the result of read access (S1005). The cache area reservation unit 107 at the time of access request can allocate the cache area 113 from the host computer 132.

The data access controller unit 104 notifies the migration controller unit 101 of the access position (S1006).

The data exchange locator unit 102 determines the position of read access request as the data exchange position (S1007), and stores it in the data exchange location information 103 (S1008).

The migration controller unit 101 then instructs the data copy unit 108 to copy to the cache area 111 the data 421 present at the data exchange position on the volume 121 (S1009).

Next, the migration controller unit 101 instructs the data copy unit 108 to copy to the data exchange position 422 on the volume 122 the data present in the cache area 111 (S1010). In a similar manner the data copy unit 108 copies to the data exchange position 421 on the volume 121 the data present in the cache area 113 (S1012).

Finally, for the location of completed data exchange, the corresponding row in the exchanged location management table 950 is updated to "data exchange done" status.

Fourth Embodiment

FIG. 12A to FIG. 16 show a fourth embodiment of this invention, in which data exchange operation between three volumes is performed in parallel.

Now the operation of performing two migrations in parallel will be described in greater details herein below, where one is the migration from the volume 121 to the volume 122, the other is the migration from the volume 122 to a volume 123, with reference to FIG. 12A, FIG. 12B, FIG. 13, FIG. 14, and FIG. 15.

Figure 12A:
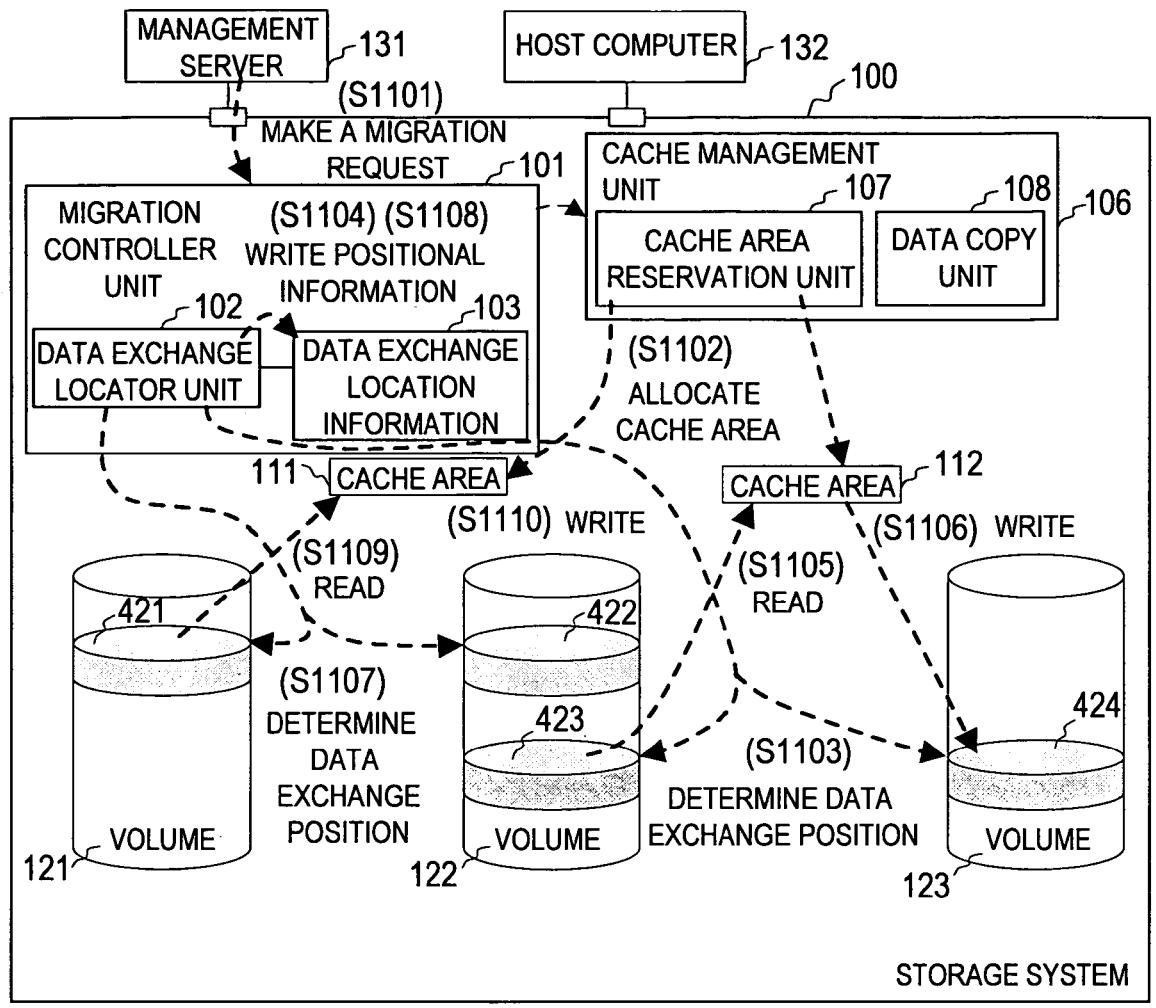
FIG. 12A is a schematic diagram illustrating data movement between plural volumes by means of cache areas, according to fourth embodiment of this invention.

FIG. 12A is a schematic diagram of the operation of two migrations in parallel, where one is the migration from the volume 121 to the volume 122, the other is the migration from the volume 122 to the volume 123.

The management server 131 issues a data movement request (migration request) to the migration controller unit 101, specifying the volume 121, the volume 122 and the volume 123 (S101).

The migration controller unit 101, upon reception of the migration request, instructs the cache management unit 106 to reserve the available cache area 111 and cache area 112 to be served as the working space of data exchange (S1102).

Figure 12B:
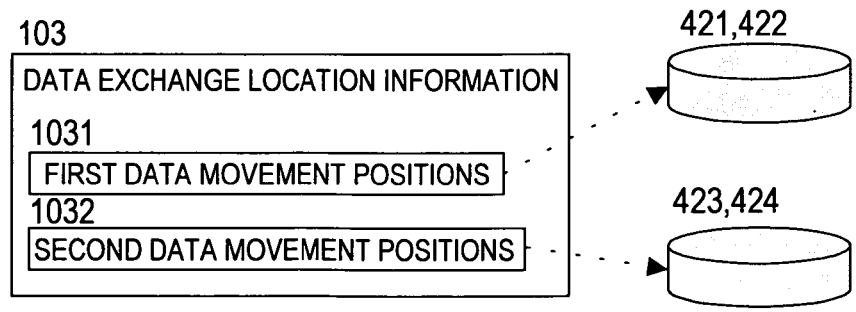
FIG. 12B is a schematic diagram illustrating exemplary data exchange position information for managing plural data movement positions.

The migration controller unit 101 uses the data exchange locator unit 102 (S1103) to determine a data movement request with respect to the data movement from the volume 122 to the volume 123, and then stores it to the data exchange location information 103 (S1104). The data exchange location information 103 stores plural data exchange positions in response to the number of data movement, as shown in FIG. 12B. As shown in FIG. 12a, the data movement position from the volume 121 to the volume 122 (421 and 422 in FIG. 12A) will be stored in first data movement position 1031 of the data exchange location information 103, while the data movement position (423 and 424 in FIG. 12A) from the volume 122 to the volume 123 will be stored in second data movement position 1032 of the data exchange location information 103.

The first data movement positions 1031 and the second data movement positions 1032 are set such that they do not coincide, such as for example second data movement position>first data movement position.

The migration controller unit 101 then instructs the data copy unit 108 to copy data 423 present at the data exchange position in the volume 122 to the cache area 112 (S1105).

Next the migration controller unit 101 instructs the data copy unit 108 to copy data present in the cache area 112 to the data exchange position 424 of the volume 123 (S1106).

By iteratively repeating the foregoing steps S1103 to S1106, data stored in the volume 122 will be copied to the volume 123.

At the same time as the above steps S1103 to S1106 are executed, the following steps S1107 to S1110 will be executed in parallel.

The migration controller unit 101 uses the data exchange locator unit 102 to determine the data movement position with respect to the data movement from the volume 121 to the volume 122 (S1107), and stores it to the data exchange location information 103 (S1108).

In the data exchange location information 103, the data movement position information to be stored in step S1104 and the data exchange position information to be stored in step S1108 are mutually independently stored.

Next, the data 422 of the data movement position stored in Si 108 of the volume 122 is checked to see if it is written to the volume 123, and wait for a predetermined period of time if it is not yet written thereto.

This step prevents the data of the volume 122 from being overwritten prior to being moved to the volume 123.

Next, the migration controller unit 101 instructs the data copy unit 108 to copy the data 421 present at the data movement position of the volume 121 to the cache area 111 (S1109).

Then, the migration controller unit 101 instructs the data copy unit 108 to copy data present in the cache area 111 to the data movement position 422 of the volume 122 (S1110).

By iteratively repeating the steps S1107 to S1110 above, data stored in the volume 121 will be copied to the volume 122.

When the repetition of steps S1103 to S1106 and the repetition of steps S1107 to 1110 have been complete, data stored in the volume 121 will have been moved to the volume 122, and data stored in the volume 122 will have been moved to the volume 123.

Figure 13:
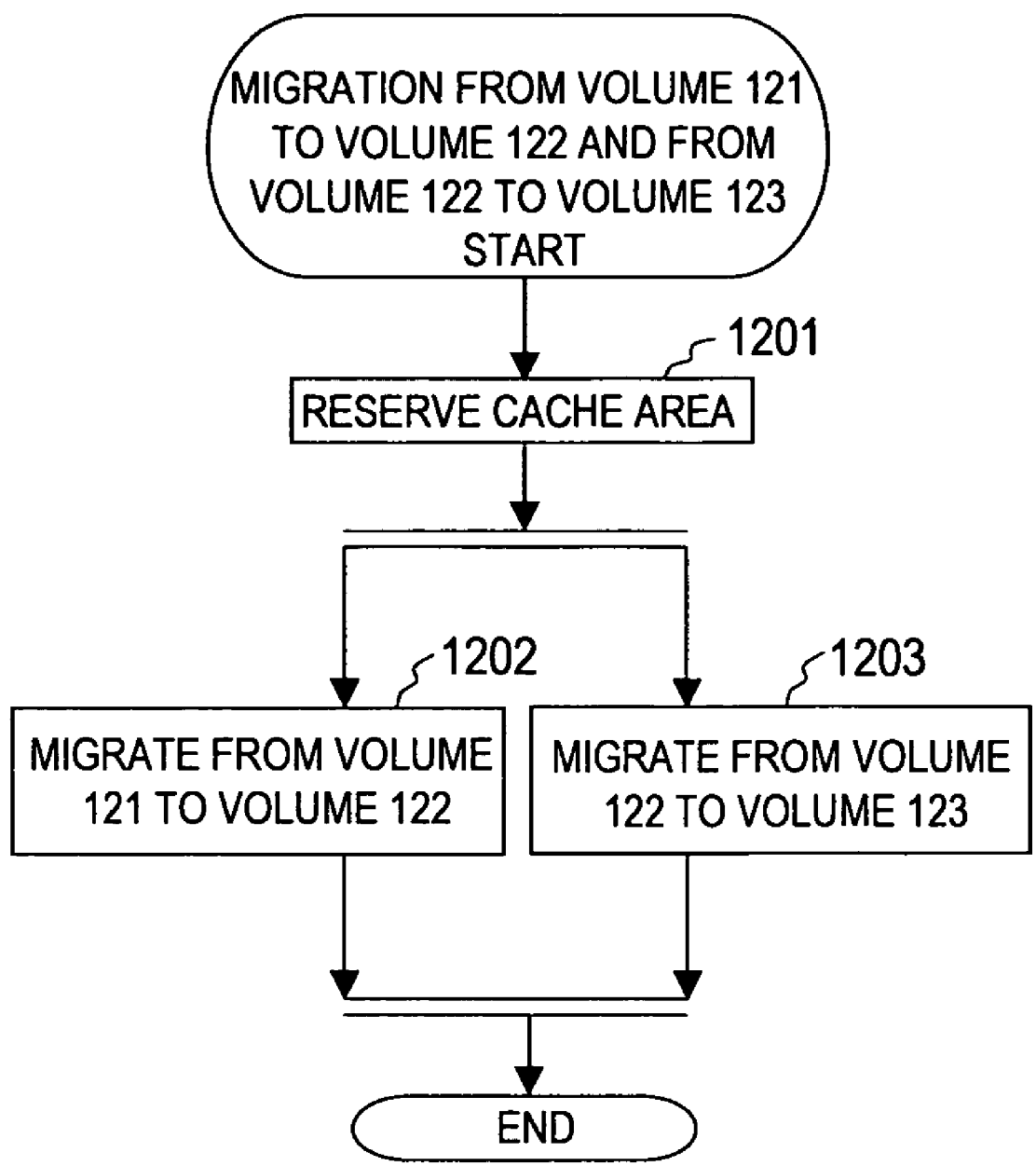
FIG. 13 is a flow chart of data movement between plural volumes by means of cache areas.

FIG. 13 is a flow chart of the operation of two migrations in parallel by various control units in the storage system 100.

In step 1201, the migration controller unit 101 instructs the cache area reservation unit 107 to reserve a cache area for the temporary workspace for the data movement.

In step 1202, as will be described later, the migration controller unit 101 performs a migration from the volume 121 to the volume 122.

In step 1203, as will be described later, the migration controller unit 101 performs another migration from the volume 122 to the volume 123.

The steps 1202 and 1203 are simultaneously initiated, and as have been described with reference to FIG. 12A above, these two migrations will have been completed when the steps 1202 and 1203 will be both completed.

As can be seen from the foregoing description, much faster data movement is enabled by parallelizing two sessions of data movement shown in FIG. 12A to move data between three volumes in parallel.

Figure 14:
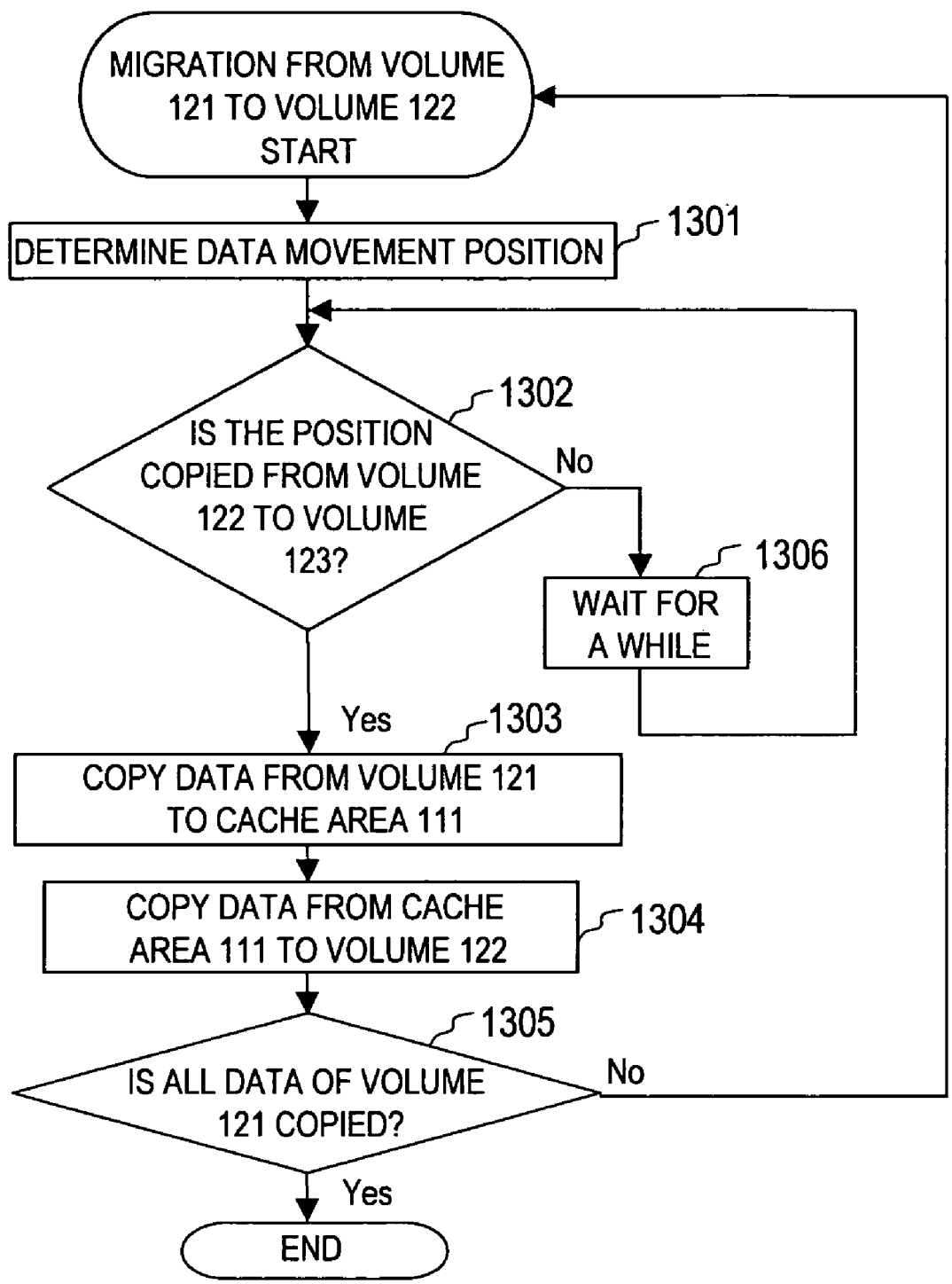
FIG. 14 is a flow chart of data movement to first destination.

FIG. 14 is a flow chart of migration from the volume 121 to the volume 122, according to the step 1202 above.

In step 1301, the data exchange locator unit 102 determines the position to start the data movement.

In step 1302, the data copy unit 108 decides whether or not the data at the data movement position in the volume 122, as determined in step 1301 above, has already been written in the volume 123. Reading the data exchange location information 103 to compare it with the current data movement position, as have been shown in the preceding first embodiment of this invention, may do this determination. If the data at the data movement position in the volume 122 has been already written, then the process proceeds to step 1303. Otherwise if not, then the process proceeds to step 1306.

In step 1303, the data copy unit 108 copies data at the data movement position from the volume 121 to the cache area 111.

In step 1304, the data copy unit 108 copies data from the cache area 111 to the data movement position 422 of the volume 122.

In step 1305, the migration controller unit 101 decides if all data copy from the volume 121 has been completed, and if there remains data not copied yet, then the process proceeds back to step 1301. On the other hand, if there is not such data, then the migration operation from the volume 121 to the volume 122 will be terminated.

In step 1306, the migration controller unit 101, after waiting for a predetermined period of time, causes the process to go back to step 1302

By iteratively repeating the steps 1301 to 1306 stated above, the data movement from the volume 121 to the volume 122 will be initiated after the data movement from the volume 122 to the volume 123 will have been completed.

Figure 15:
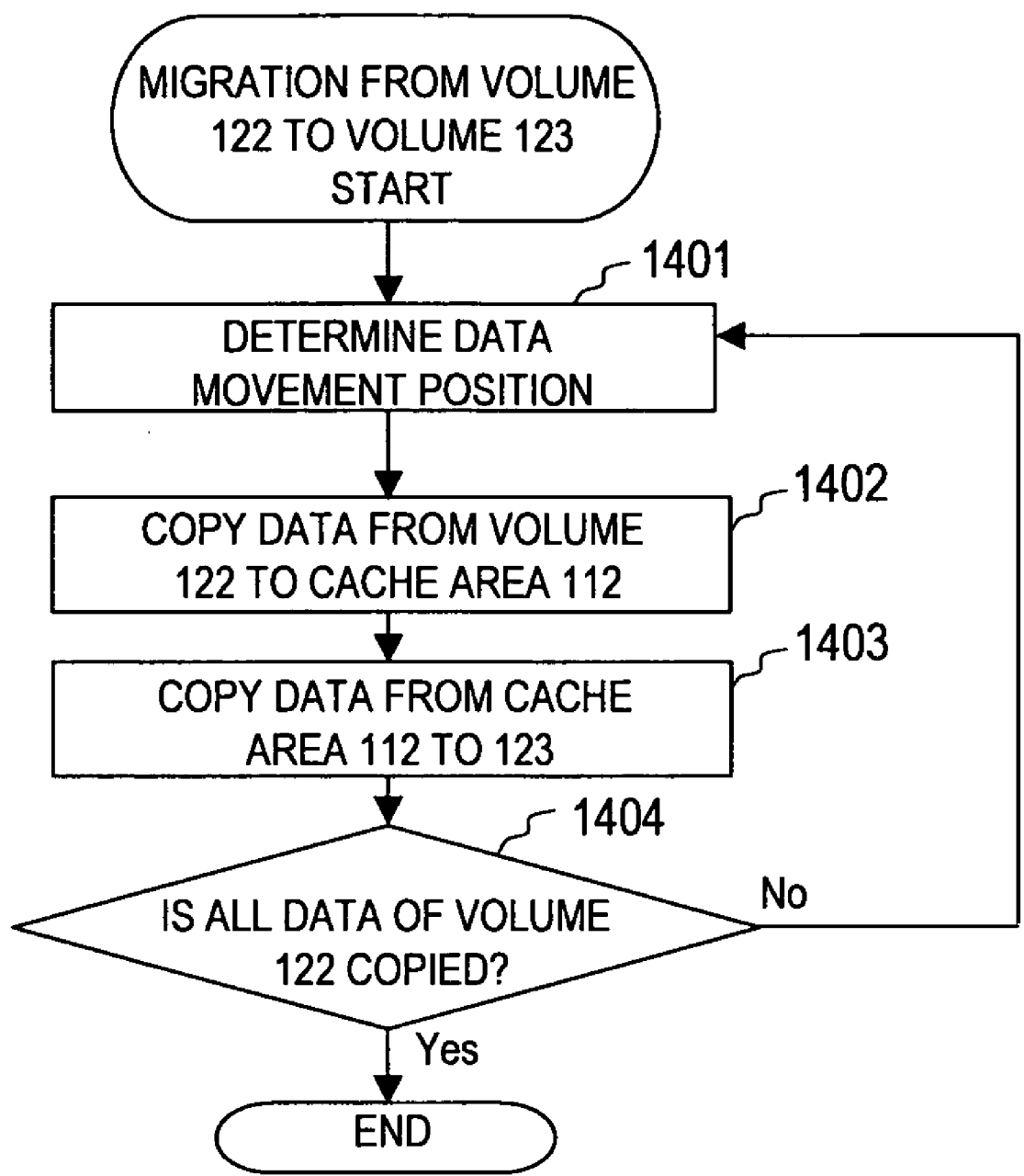
FIG. 15 is a flow chart of data movement to second destination.

FIG. 15 is a flow chart of the migration from the volume 122 to the volume 123, according to the step 1203 stated above.

In step 1401, the data exchange locator unit 102 determines the position to start the data movement.

In step 1402, the data copy unit 108 copies data at the data movement position from the volume 122 to the cache area 112.

In step 1403, the data copy unit 108 copies data from the cache area 112 to the data movement position of the volume 123.

In step 1404, the migration controller unit 101 decides whether or not all data copy from the volume 122 has been completed, and if there still remains data not yet copied, then the process proceeds back to step 1401. If otherwise there is not such data the migration operation from the volume 122 to the volume 123 will be terminated.

Now the operation of two parallel migration sessions during which the host computer 132 initiates I/O access to the volume 121 will be described in greater details below, with reference to FIG. 16 and FIG. 17.

Figure 16:
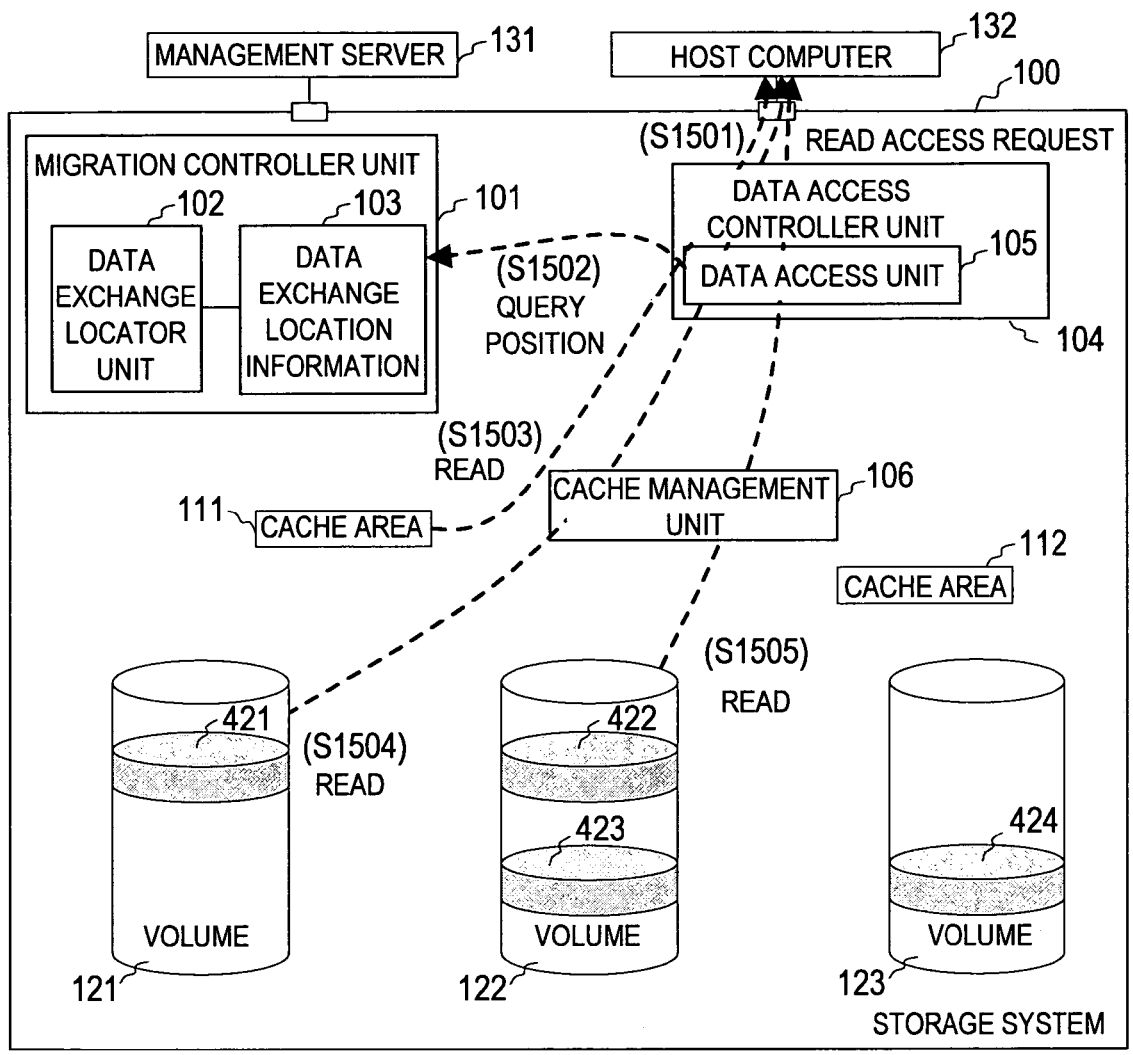
FIG. 16 is a schematic diagram of the operation when the source volume data access is initiated during plural data movement sessions.

FIG. 16 outlines the operation in which two migration sessions, i.e., a migration session from the volume 121 to the volume 122 and another from the volume 122 to the volume 123, are running in parallel, during which sessions the host computer 132 initiates a read access request to the volume 121.

The host computer 132 initiates a read access request to the data access controller unit 104 with the volume 121 and the read access request position being specified (S1501). The data access controller unit 104 instructs the data access unit 105 to handle the read access request.

The data access unit 105 queries the data exchange location information 103 about the data movement position of current data movement in progress, for the migration from the volume 121 to the volume 122 (S1502). If the read access request location is equal to the data movement position in the data exchange location information 103, then the data access unit 105 instructs the cache management unit 106 to read data from the cache area 111 and to transfer data to the host computer 132 (S1503).

If the read access request position is larger than the data movement position, then the requested data is not yet subject to data movement, and the data access unit 105 will direct the cache management unit 106 to read data from the read access request position on the volume 121 and to transfer data to the host computer 132 (S1504).

If the read access request position is less than the current data movement position, then the requested data has been already moved. The data access unit 105 then will direct the cache management unit 106 to read data at the read access request position in the volume 122 and to transfer data to the host computer 132 (S1505).

Figure 17:
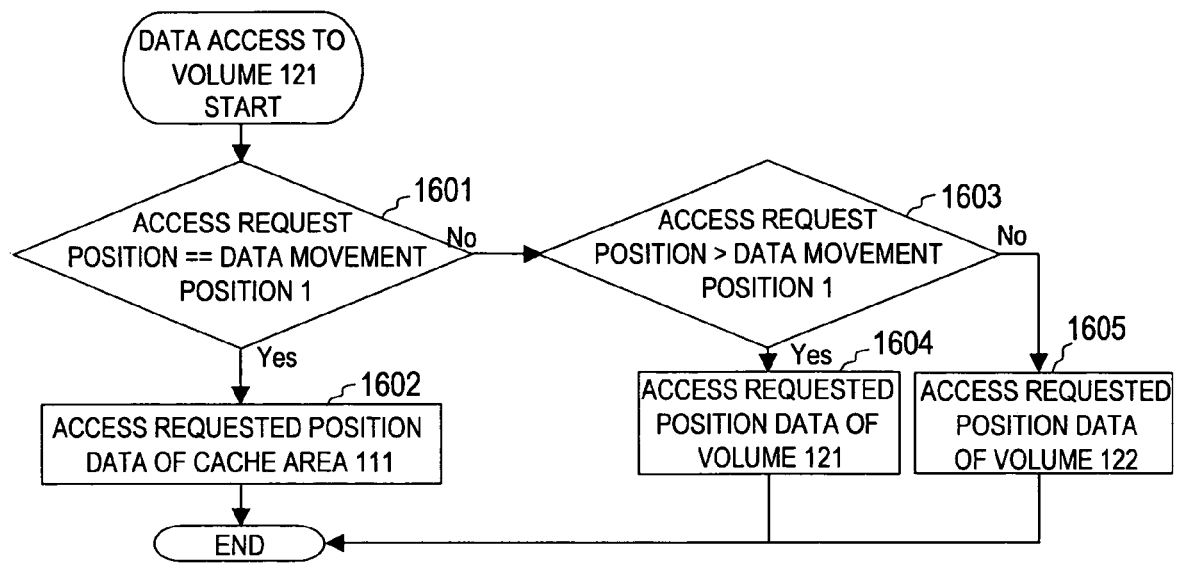
FIG. 17 is a schematic diagram of the operation when the destination volume data access is initiated during plural data movement sessions.

FIG. 17 is a flow chart showing the operation principally executing in the data access unit 105 when two migration sessions, i.e., one from the volume 121 to the volume 122 and another from the volume 122 to the volume 123, is running in parallel, during which the 132 initiates a read or write access request to the volume 121.

In step 1601, the data access unit 105 decides if the data position of requested access from the host computer 132 is equal to the data movement position of current migration from the volume 121 to the volume 122. If equal then the process proceeds to step 1602, and if not then the process proceeds to step 1603.

In step 1602, the data copy unit 108 executes the request access from the host computer 132 to the data in the cache area 111 and transfers the result to the host computer 132.

In step 1603, the data access unit 105 decides whether the data position of the request access from the host computer 132 is larger than the current data exchange position. If larger then the process proceeds to step 1604, otherwise if not then the process proceeds to step 1605.

In step 1604, the data copy unit 108 executes the access requested by the host computer 132 to the data at the access request position on the volume 121 and returns the result to the host computer 132.

In step 1605, the data copy unit 108 executes the access requested by the host computer 132 to the data at the access request position on the volume 122 and returns the result to the host computer 132.

The operation described above is also applicable to the case where two migration sessions, i.e., a migration session from the volume 121 to the volume 122 and another from the volume 122 to the volume 123, are running in parallel, during which sessions the host computer 132 initiates a read or write access request to the volume 122.

More specifically, if the access request position is equal to the data exchange position then access is to the cache area 112; if the access request position is larger than the data exchange position then the access is to the volume 122; and if the access request position is less than the data exchange position then the access is to the volume 123.

In the fourth embodiment of this invention as described above, when data on the volume 123 is to move to the volume 121, three cache areas 111, 112, 113 are used to perform a data exchange in a similar manner as the first embodiment above. More specifically, the data movement from the volume 121 to the volume 122, the data movement from the volume 122 to the volume 123, and the data movement from the volume 123 to the volume 121 may be initiated in parallel at the same time on the same data exchange locations, allowing the data exchange operation between three volumes to run faster by using caches.

Fifth Embodiment

Figure 18:
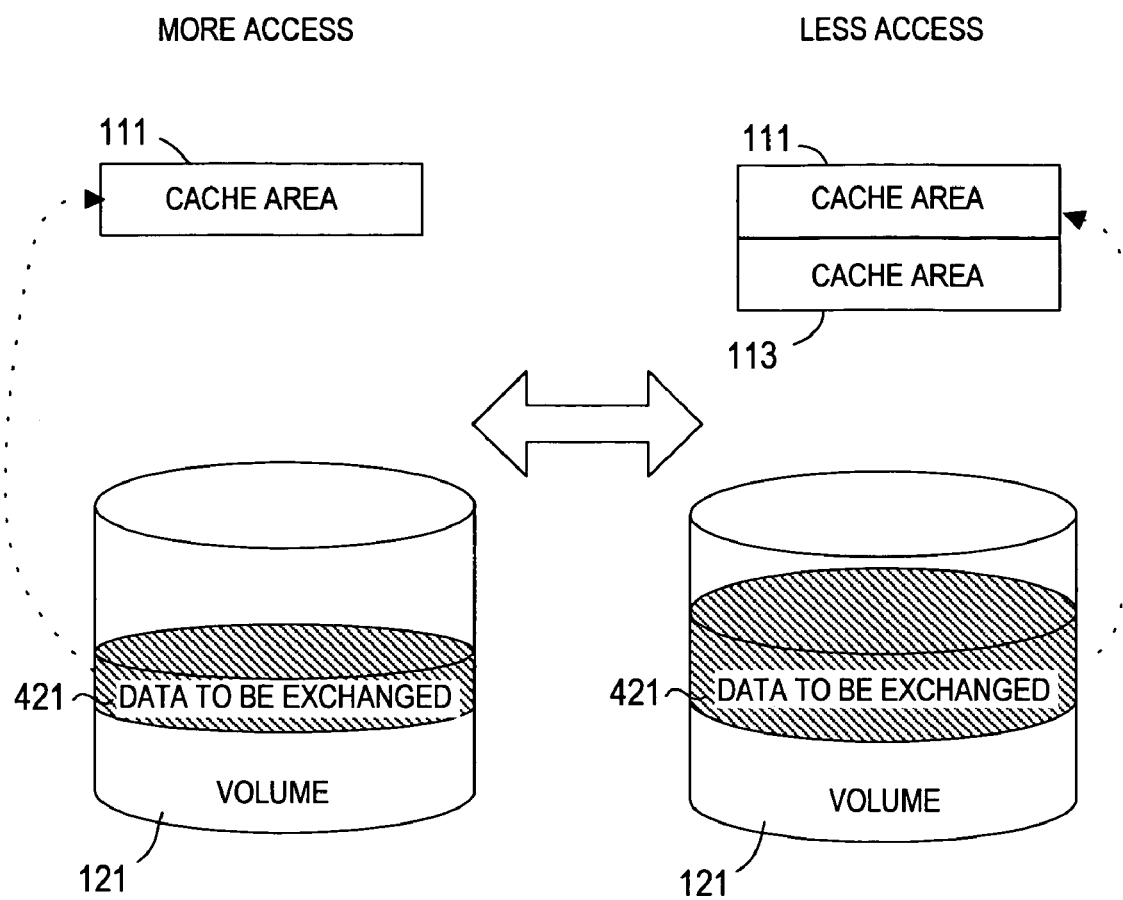
FIG. 18 is a schematic diagram of dynamic modification of cache size according to fifth embodiment of this invention.

FIG. 18 shows a fifth embodiment of this invention, which is a variation of the first embodiment, with dynamic modification of cache size.

The cache management unit 109 shown in FIG. 1 obtains from the data access controller unit 104 the number of I/O accesses by the host computer 132 at the initiation of the data exchange or data movement. If there are a number of I/O accesses, then it will allocate one cache area 111 dedicated to the temporary storage for data exchange of the volume 121. When there are fewer I/O accesses, the cache management unit 109, on the other hand, will allocate the caches 111 and 113 for the temporary storage for data exchange of the volume 121. The cache management unit 106 will notify the migration controller unit 101 of the size of the caches allocated for the data exchange session.

Thereby, when there are a number of I/O accesses, minimal requisite caches are used to perform data exchange to prevent the decrease of I/O access performance in the storage system 100 during data exchange. While on the other hand there are only fewer I/O accesses, more caches are allocated for data exchange to increase the size of exchange data 421 that is read or write at once, allowing an improvement of processing rate of the data exchange.

Although FIG. 18 shows an example which changes the number of caches to be allocated for the data exchange from within plural cache areas 111 to 116 which are set dedicated to cache, the size of the cache area 111 may also be changed.

CONCLUSION

As described above, the migration according to this invention, if data in use is stored in the destination volume, the data will be copied to a disk cache or RAID cache, and then the data in the source and in the destination will be each written to their respective target volume to eliminate the need of temporary storage as well as to achieve a faster data exchange.

Although in the foregoing description of embodiments, data exchange and data movement between plural volumes use cache areas configured on the memory of the storage system 100, the migration as described above may be achieved by using the RAID cache within a server computer. More specifically, in a server computer having a RAID controller and RAID cache, the RAID controller may serve as the disk controller unit 1100 while the RAID cache may serve as the cache areas 111 to 116.

Although in the first embodiment the cache area and the control program executed by the CPU 11 are stored in one single memory 12, the cache may be configured in a physically different memory. In such a case the memory containing the cache area may be connected to the data transfer controller unit 13.

The method according to this invention is applicable to the data migration of a storage system having a disk cache or RAID cache.

While the present invention has been described in detail and pictorially in the accompanying drawings, the present invention is not limited to such detail but covers various obvious modifications and equivalent arrangements, which fall within the purview of the appended claims.

What is claimed is:

1. A method for mutually exchanging data between a first volume and a second volume configured in a computer disk drive, comprising the steps of:
    allocating on a memory of said computer a temporary storage area for said data exchange;
    determining a location on said first volume of said data to be exchanged;
    reading data from said determined location on said first volume to store in said temporary storage area; and
    writing data in said temporary storage area to said determined location on a volume different from said volume from which said data was read,
    wherein said temporary storage area includes a first temporary storage area and a second temporary storage area,
    wherein said step of reading data from said determined location further comprises:
    copying the data on said first volume to said first temporary storage area; and
    copying the data on said second volume to said second temporary storage area, and
    wherein said step of writing data further comprises:
    copying the data in said second temporary storage area to said determined location on said first volume; and
    copying the data in said first temporary storage area to said determined location on said second volume.

2. The method for mutually exchanging data between a first volume and a second volume according to claim 1, further comprising the step of:
    having positional information on the volumes that data was exchanged last time,
    wherein said step of determining location of the data to be exchanged further comprises:
    setting said location of the data to be exchanged to the position which is the sum of said positional information and the size of said temporary storage area, when said positional information is present; and
    setting said location of the data to be exchanged to the head of said first volume, when said positional information is absent.

3. The method for mutually exchanging data between a first volume and a second volume according to claim 2, further comprising the step of:
    receiving an access request to said first volume during data exchange between said volumes;
    accessing said first volume if a data position corresponding to said access request is posterior to said positional information;
    accessing said second volume if said data position corresponding to said access request is anterior to said positional information; and
    accessing said first temporary storage area if said data position corresponding to said access request is included in said positional information.

4. The method for mutually exchanging data between a first volume and a second volume according to claim 2, further comprising the step of:
    receiving a suspension request or a resume request of said data exchange;
    suspending data exchange upon said suspension request while maintaining the contents of said positional information; and
    resuming data exchange upon said resume request while putting the contents of said positional information into the current data exchange position.

5. The method for mutually exchanging data between a first volume and a second volume according to claim 4,
    wherein said step of suspending data exchange further comprises:
    storing said positional information as a suspended position; and
    receiving a cancellation request of data exchange after suspending said data exchange, and
    wherein said step of determining the location of data to be exchanged further comprises:
    assigning, upon reception of said suspension request, if there is said positional information, a value of positional information subtracted by the size of the temporary storage area from said positional information into the location of data to be exchanged; and
    assigning, upon reception of said suspending request, if there is not said positional information, a value of positional information subtracted by the size of the temporary storage area from said suspended position into the location of data to be exchanged.

6. The method for mutually exchanging data between a first volume and a second volume according to claim 1,
    wherein a management table divides said first volume into plural fragments and sets data exchange status of each fragment, and
    wherein said step of reading data from said determined location further comprises:
    reading data from a data segment of said first volume to copy said data into said first temporary storage area; and
    for the identical fragment of said first volume, reading data from said second volume to copy said data into said second temporary storage area,
    wherein said step of writing into said volume further comprises:
    copying data copied to said first temporary storage area into said fragment of said second volume; and copying data copied to said second temporary storage area into said fragment of said first volume, and wherein said method further comprises the step of:

updating the data exchange status of said fragment of said management table.

7. The method for mutually exchanging data between a first volume and a second volume according to claim 6, further comprising the step of:

receiving an access request to said first volume during data exchange between said volumes; and upon reception of said access request, accessing said first volume in correspondence with said access request, wherein said step of determining the location of data to be exchanged further comprises:

assigning an accessed location into the data exchange position by priority.

8. The method for mutually exchanging data between a first volume and a second volume according to claim 1, further comprising the step of:

dynamically modifying the size of said temporary storage area; and determining said size of data to be read and written from and to said first volume and said second volume in correspondence with said size of the temporary storage area, wherein said step of determining the location of data to be exchanged further comprises:

determining the location of next data to be exchanged in correspondence with the determined size.

9. The method for mutually exchanging data between a first volume and a second volume according to claim 1, further comprising the step of:

determining whether or not said second volume is in use; and copying data from said first volume to said second volume as long as said second volume is not in use.

10. A method for moving data stored in a first volume and a second volume configured in a disk drive of a computer, comprising the steps of:

allocating a temporary storage area served for data exchange on a memory of said computer;

determining the location of the data to be exchanged;

reading the data from said determined location of both said first volume and second volume to store the data in said temporary storage area; and writing the data originated from said first volume among data stored in said temporary storage area into said determined location of said second volume, and writing the data originated from said second volume among data stored in said temporary storage area into the determined location of a third volume, wherein said step of allocating said temporary storage area further comprises:

allocating a first temporary storage area and a second temporary storage area for data movement, wherein said step of determining the location of said data to be exchanged further comprises:

determining the data movement position in the first volume; and determining the data movement position in the second volume, wherein said step of writing the data further comprises:

copying data in said second temporary storage area into said data movement position of the third volume;

determining whether or not the data of said second volume is copied to said data movement position of the third volume;

determining again after waiting for a predetermined period of time if the data is not copied to said data movement position of said third volume;

copying the data at the data movement position of said first volume into said first temporary storage area if the data has been copied to said data movement position of said third volume;

copying the data in said first temporary storage area into said data movement position of the second volume, wherein said temporary storage area includes a first temporary storage area and a second temporary storage area, wherein said step of reading data of said volume to store into the temporary storage area further comprises:

copying the data on said first volume to said first temporary storage area; and copying the data on said second volume to said second temporary storage area, and wherein said step of writing data further comprises:

copying the data in said second temporary storage area to said determined location on said first volume; and copying the data in said first temporary storage area to said determined location on said second volume.

11. The method of moving data stored in a first volume and a second volume, according to claim 10, further comprising the substeps of:

receiving an access request to the first volume during data movement between said volumes;

accessing said first volume if the location of data in correspondence with said access request is in posterior to the position of said data to be moved;

accessing said second volume if the location of data in correspondence with said access request is in anterior to the position of said data to be moved;

accessing first temporary storage area if the location of data in correspondence with said access request is included in the position of data to be moved;

receiving an access request to the second volume during data movement between said volumes;

accessing said second volume if the location of data in correspondence with said access request is in posterior to said position of data to be moved;

accessing said third volume if the location of data in correspondence with said access request is in anterior to said position of data to be moved; and accessing the second temporary storage area if the location of data in correspondence with said access request is included in the position of data to be moved.

12. A storage system, including:

a plurality of disk drives;

a disk controller unit for assigning volumes to said disk drives and for controlling the access to said volumes; and a memory including a cache area for temporary storage of data of said volumes, wherein said disk controller unit comprises:

a migration controller unit for receiving a data exchange request between said volumes from an administrating computer for determining the data exchange position on said volumes;

a data accessing unit for obtaining the data exchange position from said migration controller unit to access the volume during data exchange via said cache management unit based on said obtained data exchange position, wherein said migration controller unit further comprises:

a data exchange position determining unit for determining the data exchange position within the volumes subject to data exchange; and a data exchange position information storage unit for storing said data exchange position, wherein said data exchange position determining unit sets the position of said positional information added to the temporary storage area to the data location if there is said positional information, and wherein said data exchange position determining unit sets the position of data subject of data exchange to the head of said volume if there is not said positional information.

13. A storage system according to claim 12, wherein said migration controller unit further comprises:

a data exchange management table for dividing the volume subject to said data exchange into plural fragments and for assigning data exchange status of each of said fragments;

a data exchange position determining unit for updating the data exchange management table corresponding to said fragments having said data exchange completed, and for determining next data exchange position by locating said fragments that the data exchange is not yet completed.

* * * * *